(12) United States Patent
Nomura et al.

(10) Patent No.: US 7,546,028 B2
(45) Date of Patent: Jun. 9, 2009

(54) INCLINATION ANGLE ADJUSTING MECHANISM FOR IMAGE PICKUP DEVICE

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 415 days.

(21) Appl. No.: 11/548,033

(22) Filed: Oct. 10, 2006

(65) Prior Publication Data
US 2007/0086766 A1    Apr. 19, 2007

(30) Foreign Application Priority Data
Oct. 11, 2005    (JP)    ............................ P2005-296865

(51) Int. Cl.
*G03B 17/00*    (2006.01)
*H04N 5/225*    (2006.01)
*G02B 7/02*    (2006.01)
*G03B 17/02*    (2006.01)
*G03D 13/00*    (2006.01)
*G03B 21/14*    (2006.01)
*G03B 21/22*    (2006.01)

(52) U.S. Cl. .................. 396/55; 396/535; 396/661; 348/373; 348/374; 353/119; 353/122; 359/823

(58) Field of Classification Search .................. 396/55, 396/73, 75, 268, 348, 349, 535, 661; 348/208.71, 348/219.1, 340, 373, 374; 354/195.1, 195.12; 359/700, 823; 248/371, 133, 454; 411/180, 411/348, 349; 353/78, 119, 122

See application file for complete search history.

(56) References Cited
U.S. PATENT DOCUMENTS 4,768,048 A    8/1988    Wakabayashi    ......... 354/195.12
5,430,516 A    7/1995    Uziie et al.    ............... 354/195.1
5,739,962 A    4/1998    Asakura et al.    ............. 359/700
5,847,888 A *  12/1998   Takahashi    .................... 359/823
6,031,998 A    2/2000    Shono    .......................... 396/75
6,366,323 B1   4/2002    Shono    ........................ 348/340

(Continued)

FOREIGN PATENT DOCUMENTS

JP    2004-48266    2/2004

(Continued)

OTHER PUBLICATIONS

U.S. Appl. No. 11/548,800 to Nomura et al., which was filed on Oct. 12, 2006.

(Continued)

*Primary Examiner*—Melissa J Koval
(74) *Attorney, Agent, or Firm*—Greenblum & Bernstein, P.L.C.

(57) ABSTRACT

An inclination angle adjusting mechanism includes a mounting plate to which an image pickup device is mounted; a reference member holding the mounting plate; through-holes formed in the mounting plate; screw bearing seats projecting from the reference member; adjustment screws screwed into female screw holes formed in the screw bearing seats, respectively, and head portions of the adjustment screws being in contact with the mounting plate; and a biasing device so as to bring the mounting plate into contact with back surfaces of the adjustment screws. Maximum tightening positions of the adjustment screws are defined by engagement of back surfaces of the head portions with ends of the screw bearing seats, wherein the mounting plate remains not in contact with the reference surface.

13 Claims, 31 Drawing Sheets

U.S. PATENT DOCUMENTS

| | | | |
|---|---|---|---|
| 6,665,016 B2 * | 12/2003 | Saitoh | 348/374 |
| 6,773,115 B2 * | 8/2004 | Tseng et al. | 353/78 |
| 6,978,089 B2 | 12/2005 | Nomura et al. | 396/75 |
| 2003/0067544 A1 | 4/2003 | Wada | 348/208.7 |
| 2003/0156832 A1 | 8/2003 | Nomura et al. | 396/73 |
| 2006/0007320 A1 | 1/2006 | Seo | 348/219.1 |
| 2006/0115250 A1 | 6/2006 | Nomura | 396/55 |
| 2006/0115251 A1 | 6/2006 | Nomura | 396/55 |
| 2006/0115252 A1 | 6/2006 | Nomura | 396/55 |
| 2006/0115253 A1 | 6/2006 | Nomura | 396/55 |
| 2006/0115254 A1 | 6/2006 | Nomura | 396/55 |
| 2006/0115255 A1 | 6/2006 | Nomura | 396/55 |
| 2006/0115256 A1 | 6/2006 | Nomura | 396/55 |
| 2006/0115257 A1 | 6/2006 | Nomura | 396/55 |
| 2006/0115258 A1 | 6/2006 | Nomura | 396/55 |
| 2006/0115260 A1 | 6/2006 | Nomura | 396/268 |
| 2006/0115261 A1 | 6/2006 | Nomura | 396/348 |

OTHER PUBLICATIONS

English language Abstract of JP 2004-48266.

* cited by examiner

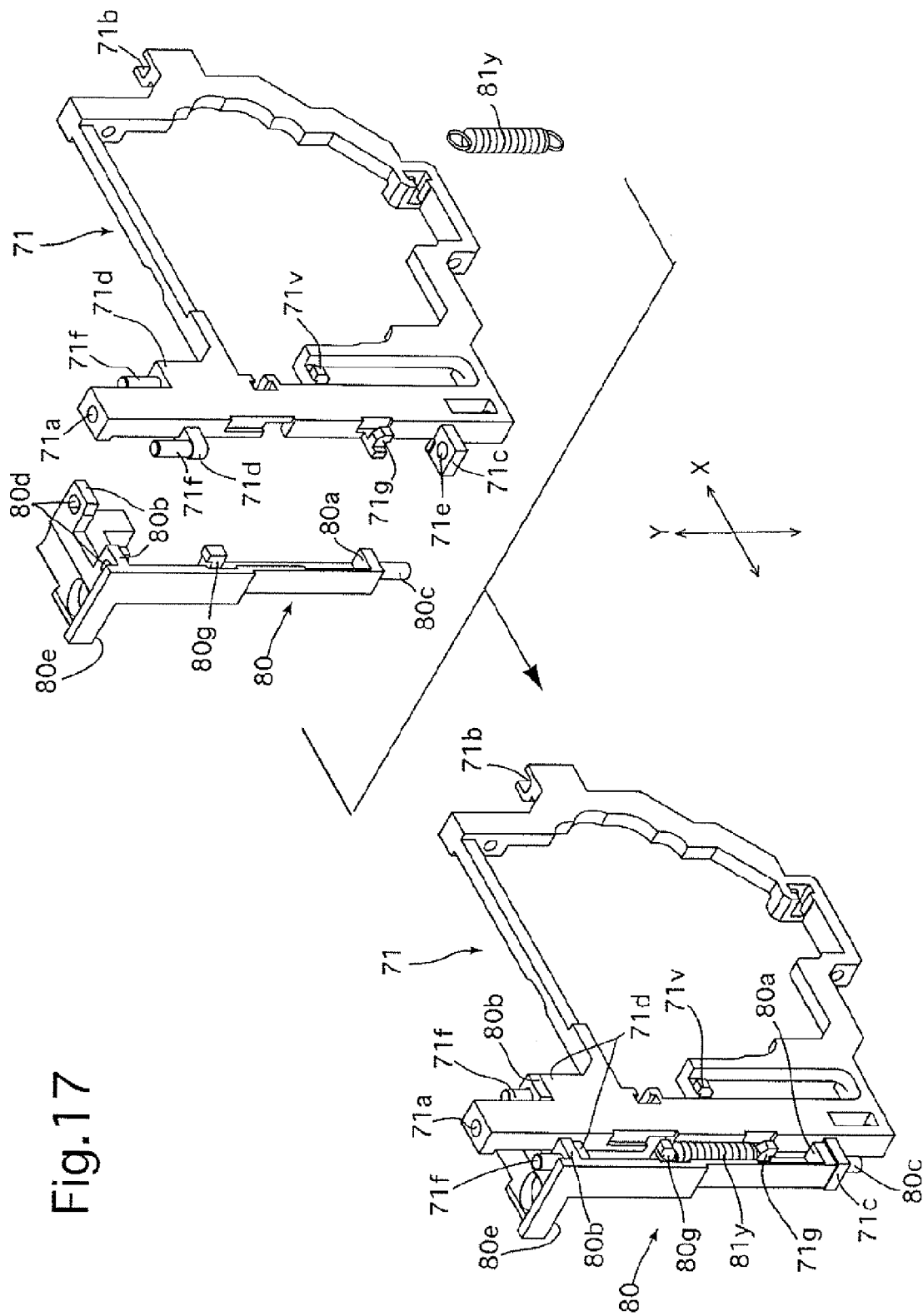

INCLINATION ANGLE ADJUSTING MECHANISM FOR IMAGE PICKUP DEVICE

BACKGROUND OF THE INVENTION

1. Field of the Invention

The present invention relates to an inclination angle adjusting mechanism for changing an angle (inclination angle) of an image pickup device provided in an imaging device such as a digital camera.

2. Description of the Related Art

Imaging devices such as digital cameras are generally provided with an inclination angle adjusting mechanism for changing the angle (inclination angle) of an image pickup device relative to an optical axis. This inclination angle can be adjusted by changing the balance among the tightening amounts of a plurality of adjustment screws. This type of inclination angle adjusting mechanism is known in the art as an inclination angle adjusting mechanism in which an image pickup device mounting member to which the image pickup device is mounted is biased in a direction away from a reference member into which the adjustment screws are screwed so that the position of the image pickup device mounting member in the aforementioned direction away from the reference member is defined by the heads of the adjustment screws. However, such a known inclination angle adjusting mechanism is constructed so that the image pickup device is held between screw bearing seats and the heads of the adjustment screws to fix the image pickup device mounting member relative to the reference member in a state where each adjustment screw is screwed into the reference member to the maximum; and accordingly, the range of tightening of each adjustment screw cannot be fully utilized to the limit as an effective range of adjustment of the inclination angle of the image pickup device.

SUMMARY OF THE INVENTION

The present invention provides an inclination angle adjusting mechanism with which the inclination angle of an image pickup device can be adjusted in an easy and reliable manner.

According to an aspect of the present invention, an inclination angle adjusting mechanism for changing the angle of an image pickup device, including a mounting plate to which the image pickup device is mounted; a reference member which holds the mounting plate; a plurality of through-holes formed in the mounting plate at positions dispersively around the image pickup device; a plurality of screw bearing seats which project from a reference surface of the reference member to correspond to the through-holes, respectively, and which have outer diameters allowing the screw bearing seats to be inserted into the through-holes, respectively; a plurality of adjustment screws, each of which includes a screw shaft portion and a head portions the screw shaft portions of the adjustment screws being screwed into female screw holes formed in the screw bearing seats, respectively, and the head portions of the adjustment screws being in contact with the mounting plate; and a biasing device which biases the mounting plate in a direction away from the reference member to bring the mounting plate into contact with back surfaces of the adjustment screws. Maximum tightening positions of the adjustment screws relative to the female screw holes of the screw bearing seats are defined by engagement of back surfaces of the head portions of the adjustment screws with ends of the screw bearing seats, respectively, wherein the mounting plate remains not in contact with the reference surface.

It is desirable for each of the through-holes of the mounting plate to be a circular hole, and for each of the screw bearing seats to be in the shape of a hollow cylinder.

It is desirable for each of the screw bearing seats to be a metal nut which is fixed to the reference member.

It is desirable for the biasing device to be a plurality of compression coil springs installed between the mounting plate and the reference member.

It is desirable for the number of the adjustment screws to be three, and for the number of the screw bearing seats to be three.

It is desirable for the inclination angle adjusting mechanism to be incorporated in an imaging stabilizer which moves the image pickup device in a plane orthogonal to an optical axis to counteract image shake of an object image formed on an imaging surface of the image pickup device.

It is desirable for the imaging stabilizer to be incorporated in a digital camera.

It is desirable for the mounting plate to include a flat portion to which the image pickup device is mounted, and a plurality of support lugs which lie in a plane parallel to another plane in which the flat portion lies. The through-holes of the mounting plate are formed in the support lugs, respectively.

It is desirable for the support lugs of the mounting plate to he positioned behind the flat portion in a rearward direction of the image pickup device, and for the screw bearing seats to be inserted into the through-holes of the support lugs of the mounting plate from a front side of the flat portion, respectively.

It is desirable for the reference member to be guided in two directions orthogonal to each other in a predetermined plane.

In an embodiment, an inclination angle adjusting mechanism for changing the angle of an image pickup device is provided, including a mounting member to which the image pickup device is mounted; a reference member which holds the mounting member; a plurality of screw bearing seats which project from a reference surface of the reference member; a plurality of adjustment screws which are positioned dispersively around the image pickup device and each of which includes a screw shaft portion and a head portion, the screw shaft portions of the adjustment screws being screwed into female screw holes formed in the screw bearing seats, respectively, and the head portions of the adjustment screws being in contact with the mounting member; and a biasing device which biases the mounting member in a direction away from the reference member to bring the mounting member into contact with back surfaces of the adjustment screws. Maximum tightening positions of the adjustment screws relative to the female screw holes of the screw bearing seats are defined by engagements of back surfaces of the head portions of the adjustment screws with ends of the screw bearing seats, respectively, wherein the mounting member remains not in contact with the reference surface.

In an embodiment, an inclination angle adjusting mechanism is provided for changing the angle of an image pickup device, including amounting member to which the image pickup device is mounted; a reference member which holds the mounting member; a plurality of screw bearing seats which project from a reference surface of the reference member; a plurality of adjustment screws which are positioned dispersively around the image pickup device and each of which includes a screw shaft portion and a head portion, the screw shaft portions of the adjustment screws being inserted through through-holes formed in the mounting member and screwed into female screw holes formed in the screw bearing seats, respectively, and the head portions of the adjustment screws being in contact with the mounting member; and a biasing device which biases the mounting member in a direction away from the reference member to bring the mounting member into contact with back surfaces of the adjustment screws. Inner diameters of the through-holes of the mounting member are greater than outer diameters of the screw bearing seats, so that the through-holes allow the screw bearing seats to be inserted thereinto, respectively. Outer diameters of the head portions of the adjustment screws are greater than the inner diameters of associated the through-holes, respectively.

It is desirable for a clearance which is defined between each of the back surfaces of the head portions of the adjustment screws and the reference surface in an axial direction of the adjustment screws to be greater than the thickness of the mounting member around the through-holes, when each of the adjustment screws is at a maximum tightening position relative to the female screw hole of the screw bearing seat.

According to the present invention, an inclination angle adjusting mechanism in which the range of tightening of each adjustment screw can be fully utilized to the limit as an effective range of adjustment of the inclination angle of the image pickup device and with which the inclination angle of an image pickup device can be adjusted in an easy and reliable manner is achieved.

The present disclosure relates to subject matter contained in Japanese Patent Application No. 2005-296865 (filed on Oct. 11, 2005), which is expressly incorporated herein by reference in its entirety.

BRIEF DESCRIPTION OF THE DRAWINGS

The present invention will be described below in detail with reference to the accompanying drawings in which:

FIG. 17 is a rear perspective view of the Y-direction moving member, the Y-direction moving stage and the associated extension joining spring that are shown in FIG. 16, showing an exploded state and an assembled state thereof;

DESCRIPTION OF THE PREFERRED EMBODIMENTS

Figure 1:
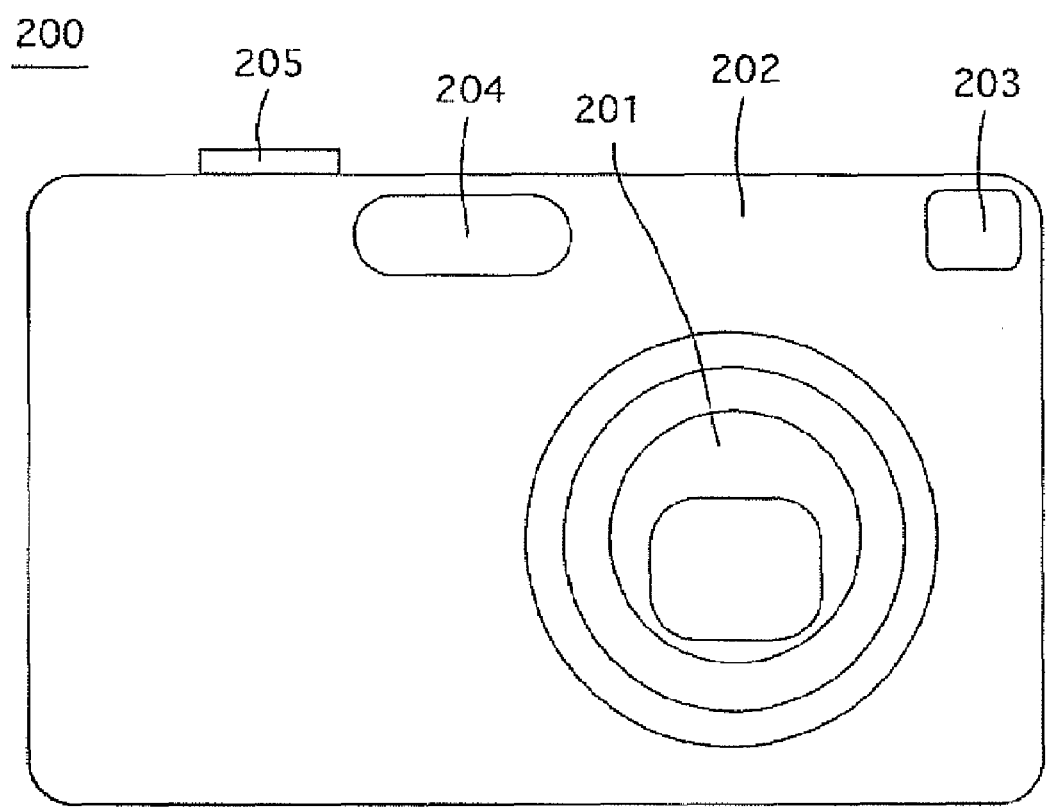
FIG. 1 is a front elevational view of an embodiment of a digital camera incorporating an inclination angle adjusting mechanism for changing the inclination angle of an image pickup device according to the present invention.

FIG. 1 shows an outward appearance of a digital camera 200 which incorporates an inclination angle adjusting mechanism for changing the inclination angle of an image pickup device according to the present invention. The digital camera 200 is provided on the front of a camera body 202 thereof with a zoom lens (zoom Lens barrel) 201, an optical view finder 203 and a flash 204, and is provided on the top of the camera body 202 with a shutter button 205.

Figure 2:
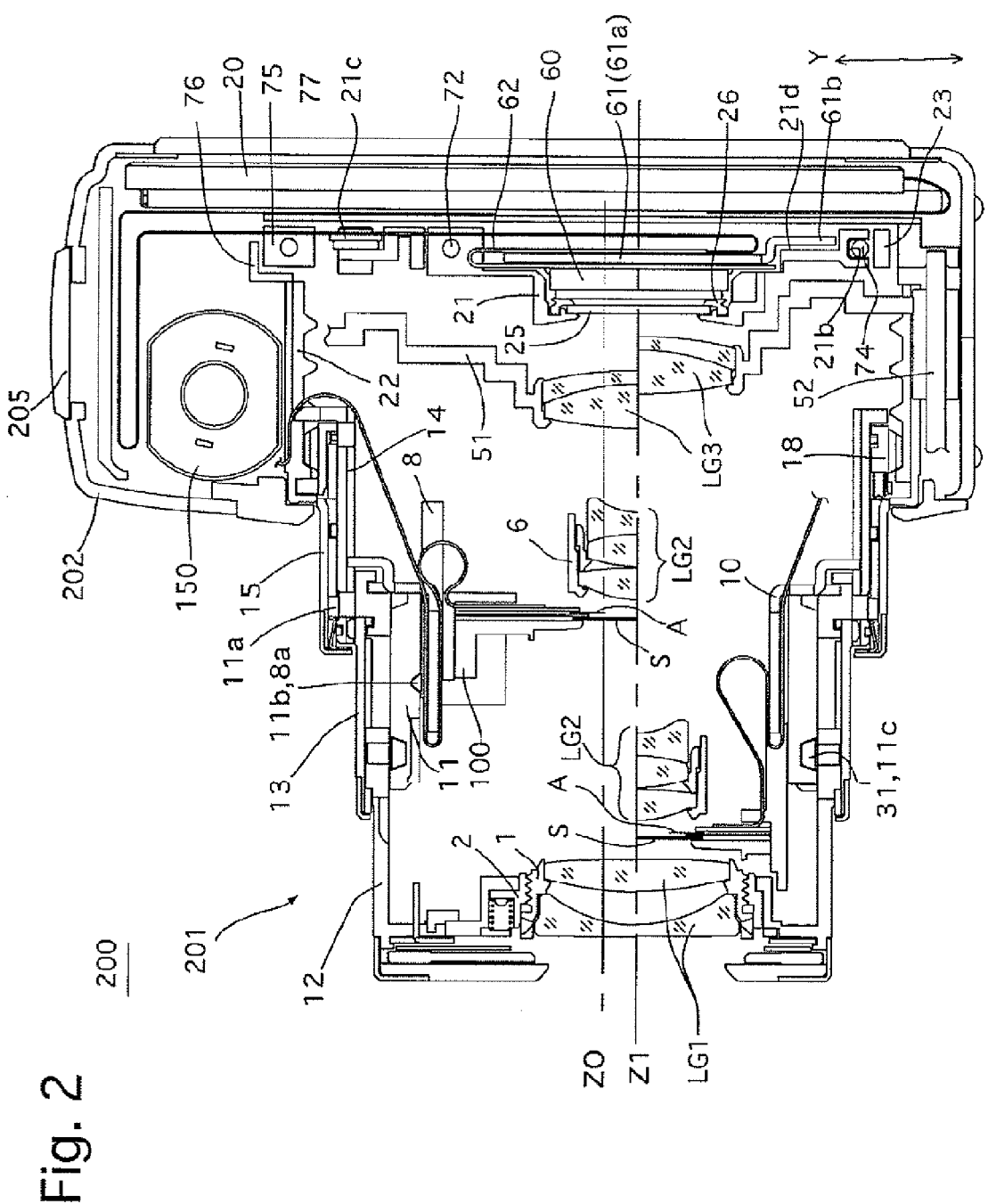
FIG. 2 is a longitudinal sectional view of the digital camera shown in FIG. 1 in a ready-to-photograph state of the zoom lens thereof.
Figure 3:
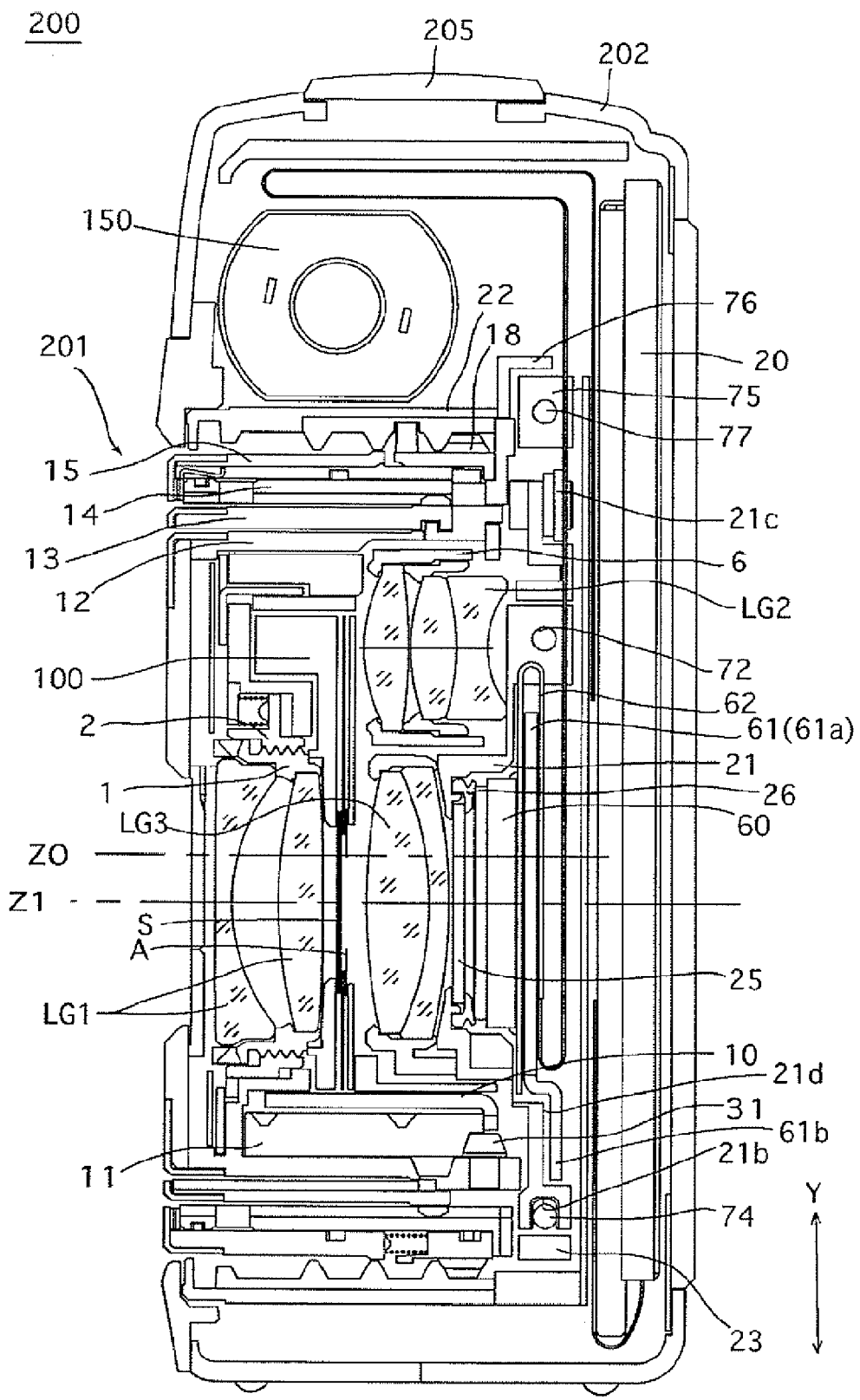
FIG. 3 is a longitudinal sectional view of the digital camera shown in FIG. 1 in the fully-retracted state of the zoom lens.
Figure 5:
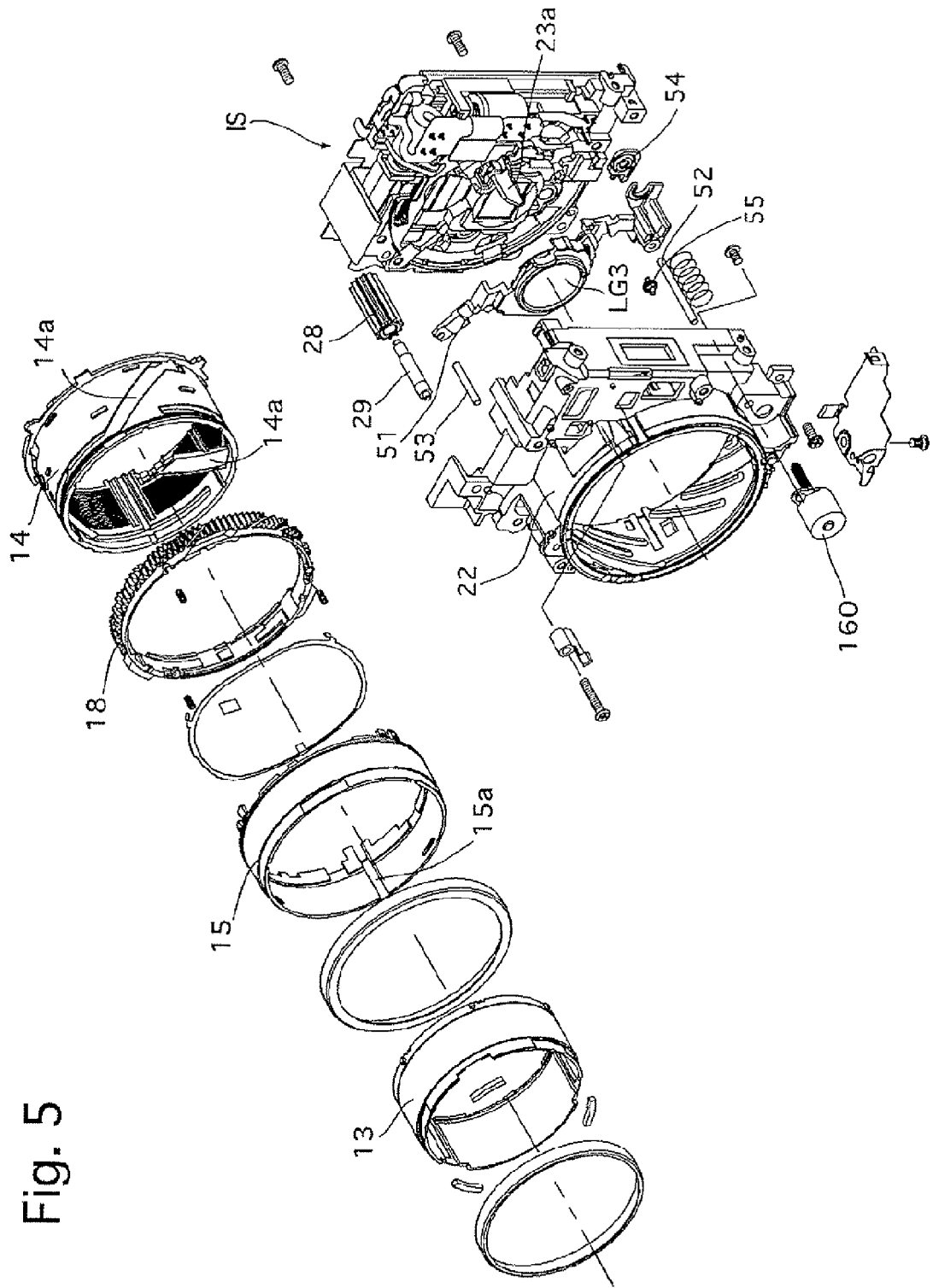
FIG. 5 is an exploded perspective view of a portion of the zoom lens shown in FIG. 4.
Figure 6:
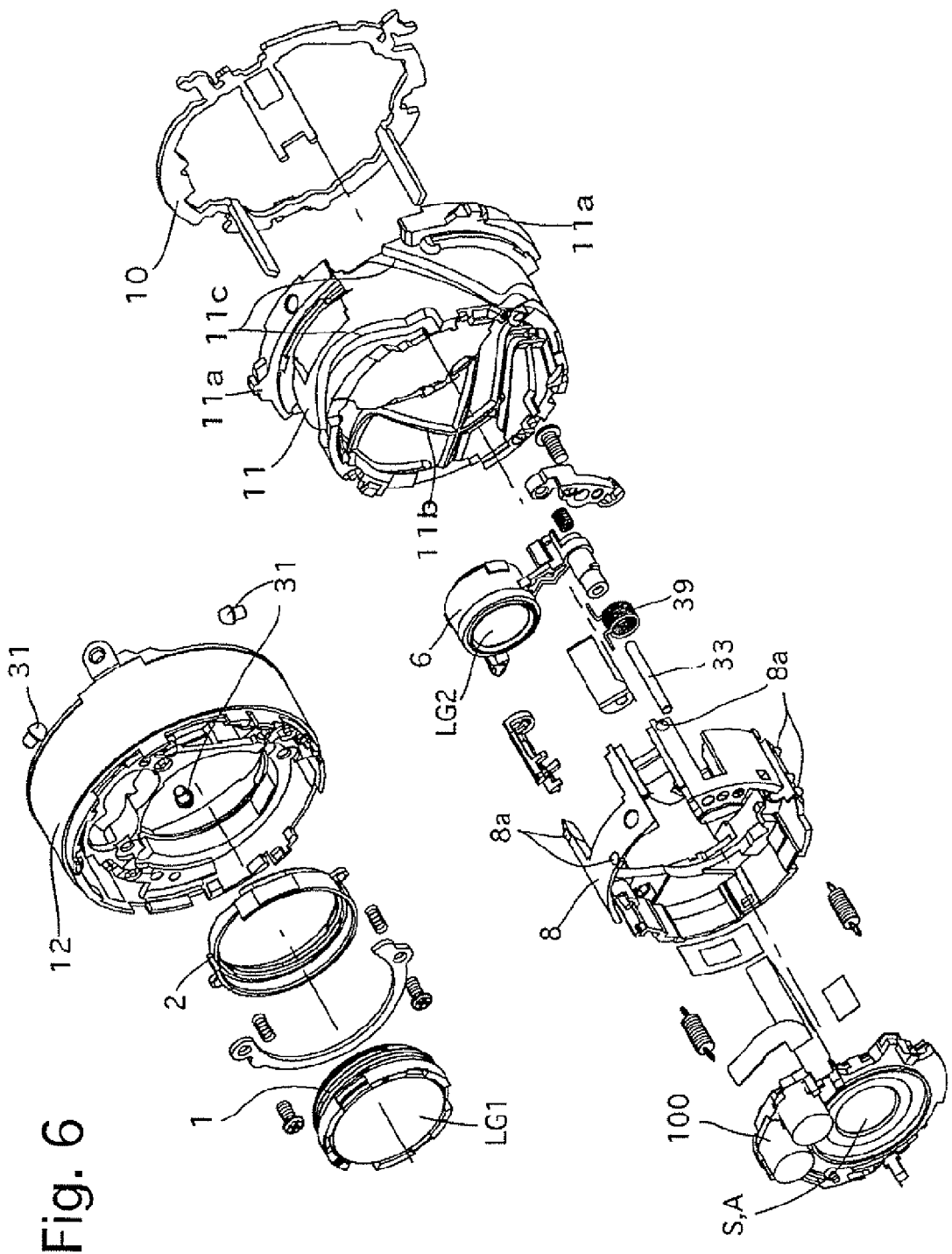
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward as viewed in FIGS. 2 and 3) from the camera body 202 as shown in FIG. 2 during a photographing operation. When photography is not being carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show a ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group LG2, a third lens group LG3, a low-pass filter 25 and a CCD image sensor 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 refer to a Y-direction and an X-direction, respectively.

The stationary barrel 22 is positioned in the camera body 202 and fixed thereto, while a stationary holder 23 is fixed to a rear portion of the stationary barrel 22. The CCD image sensor 60 and the low-pass filter 25 are supported by the stationary holder 23 via a Y-direction moving stage 71 and an X-direction moving stage (reference member) 21 to be movable in the X-direction and the Y-direction. The digital camera 200 is provided behind the stationary holder 23 with an LCD panel 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55 (see FIG. 5). The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
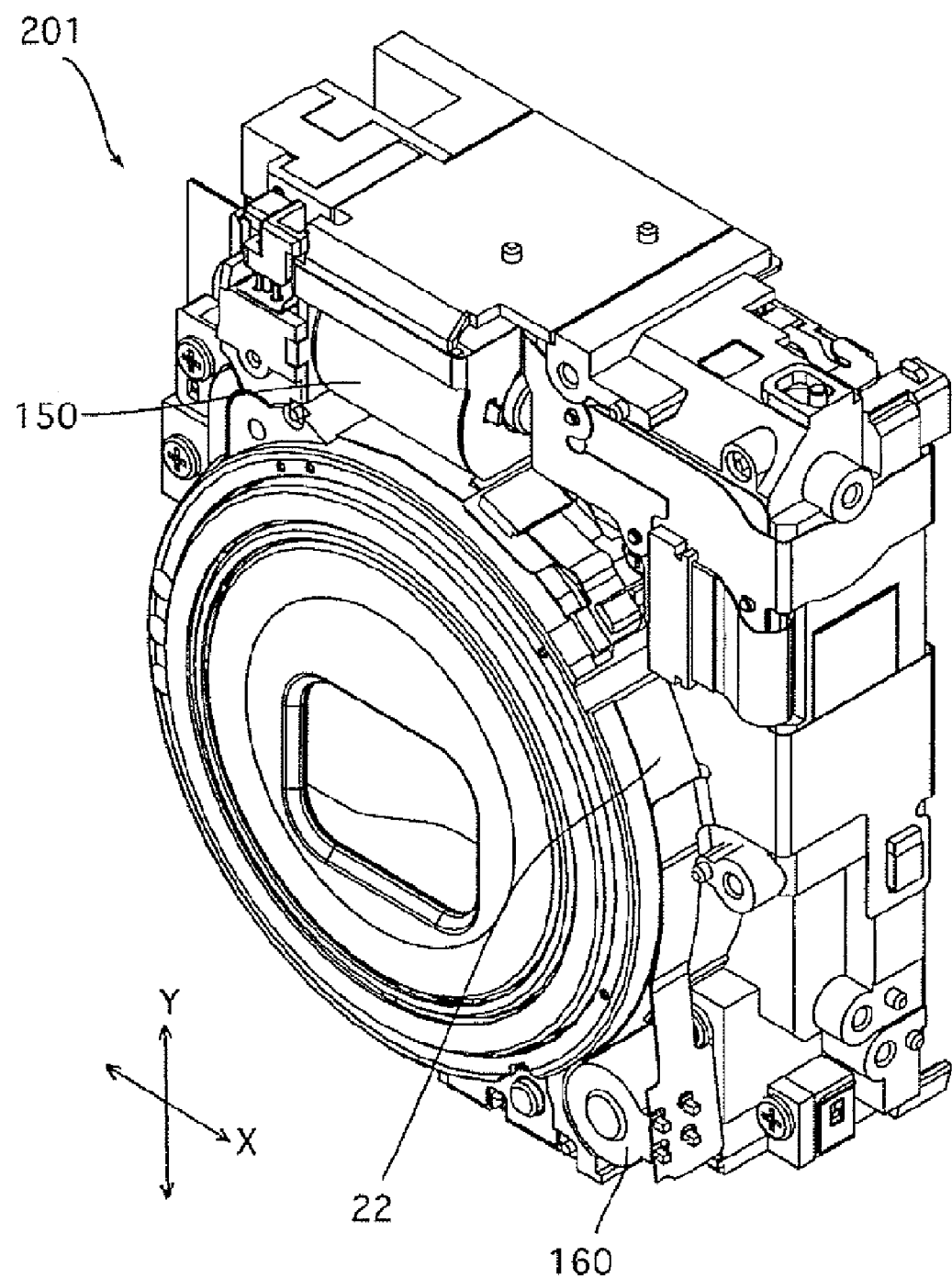
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined to the optical axis direction while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 and the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 extending parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis 21. The second lens frame 6 is biased to rotate in a direction toward the aforementioned photographing position of the second lens frame 6 by a torsion spring 39. The stationary holder 23 is provided with a position-control cam bar 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 202 being turned ON in the fully-retracted state of the zoom lens 201 shown in FIG. 3, the zoom motor 150 is driven to rotate in a lens barrel advancing direction by control of a control circuit 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. During this movement, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a with the set of three followers 11a of the cam ring 11, respectively. Once the helicoid ring 18 and the cam ring 11 advance to respective predetermined positions, the functions of a rotating/advancing mechanism (the 5 aforementioned helicoid structure) between the helicoid ring 18 and the stationary barrel 22) and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, so that the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to a picture plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, and an axial position of the second lens group LG2 relative to the picture plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographing lens axis S1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof As can be seen from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have some space therebetween which is smaller than the space in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During this retracting movement of the zoom lens 201, the second lens frame 6 rotates about the pivot shaft 33 to the radially retracted position by the position-control cam bar 23a while moving rearward together with the second lens group moving frame B when the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
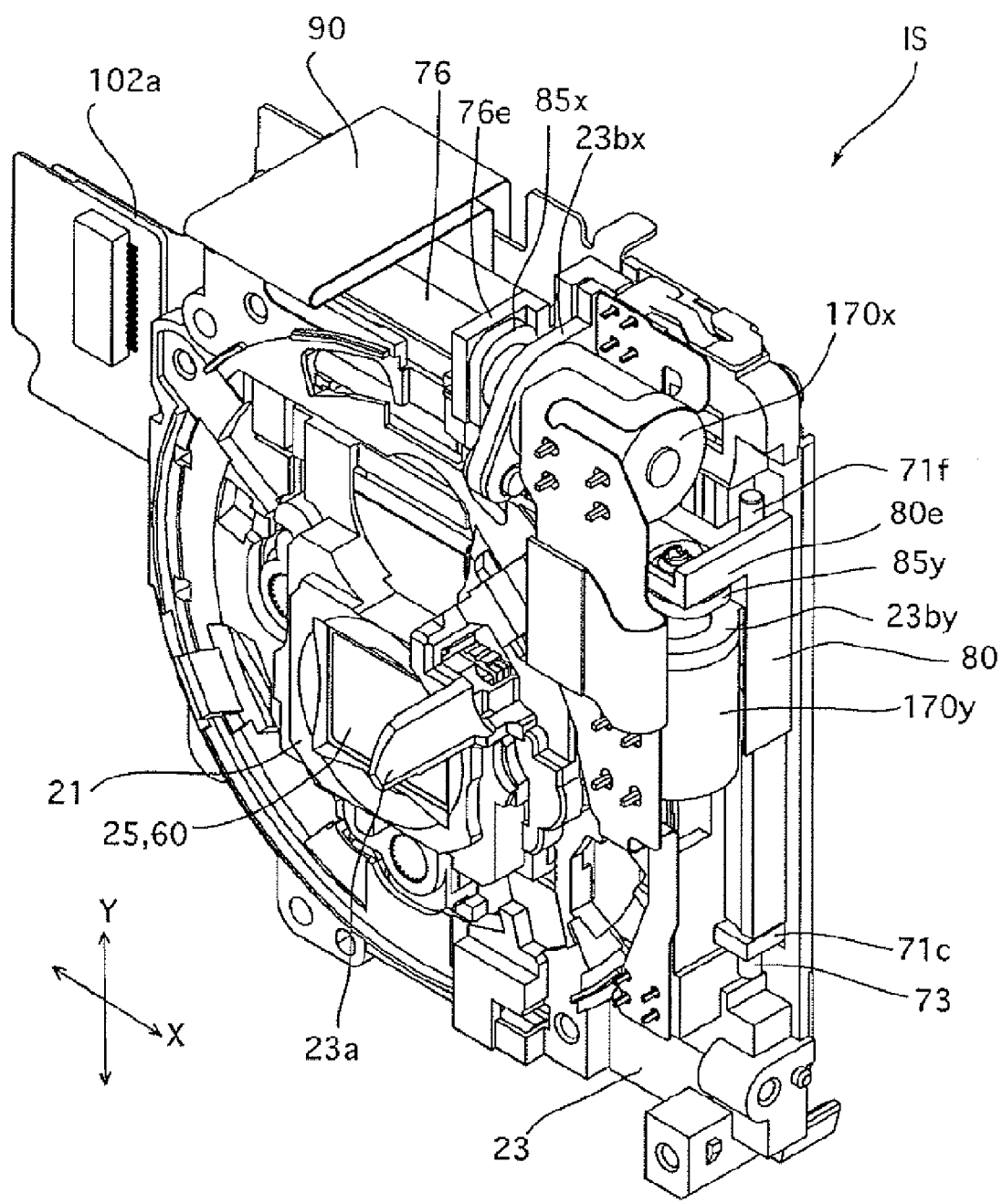
FIG. 7 is a front perspective view of an image stabilizing unit (image stabilizing mechanism) shown in FIG. 5.
Figure 8:
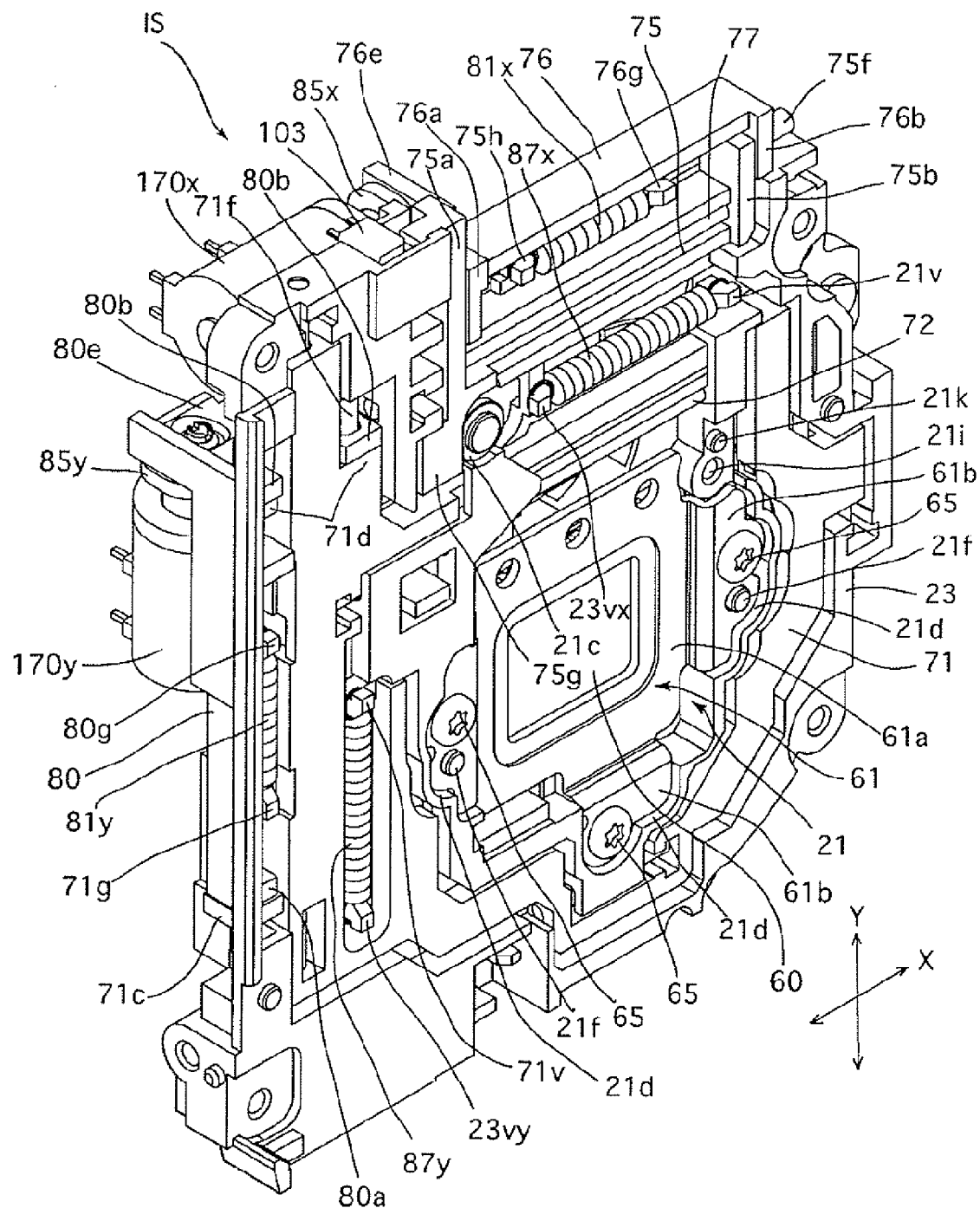
FIG. 8 is a rear perspective view of the image stabilizing unit shown in FIG. 5.
Figure 9:
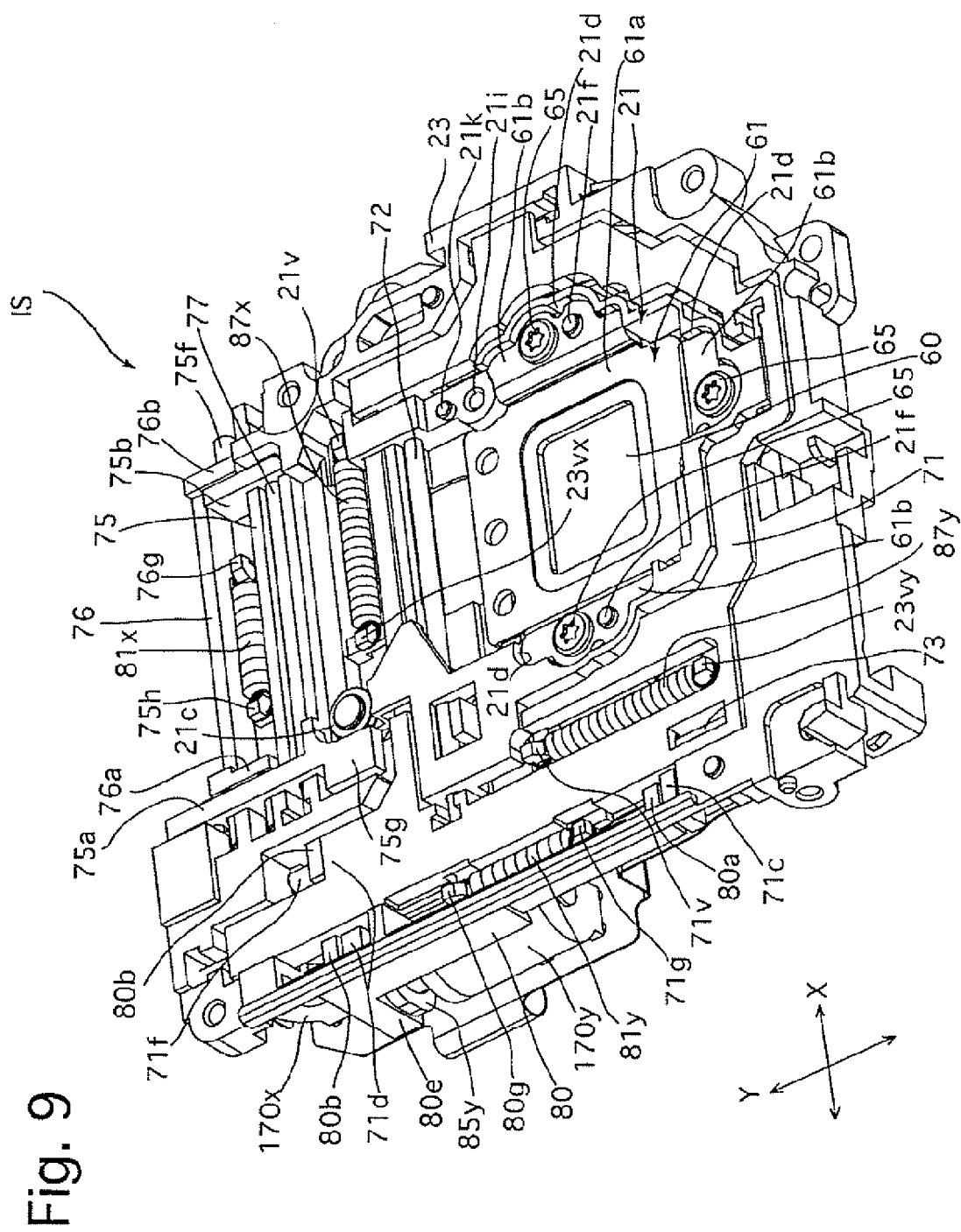
FIG. 9 is a rear perspective view of the image stabilizing unit shown in FIG. 5, viewed from an angle different from the angle of FIG. 8.
Figure 10:
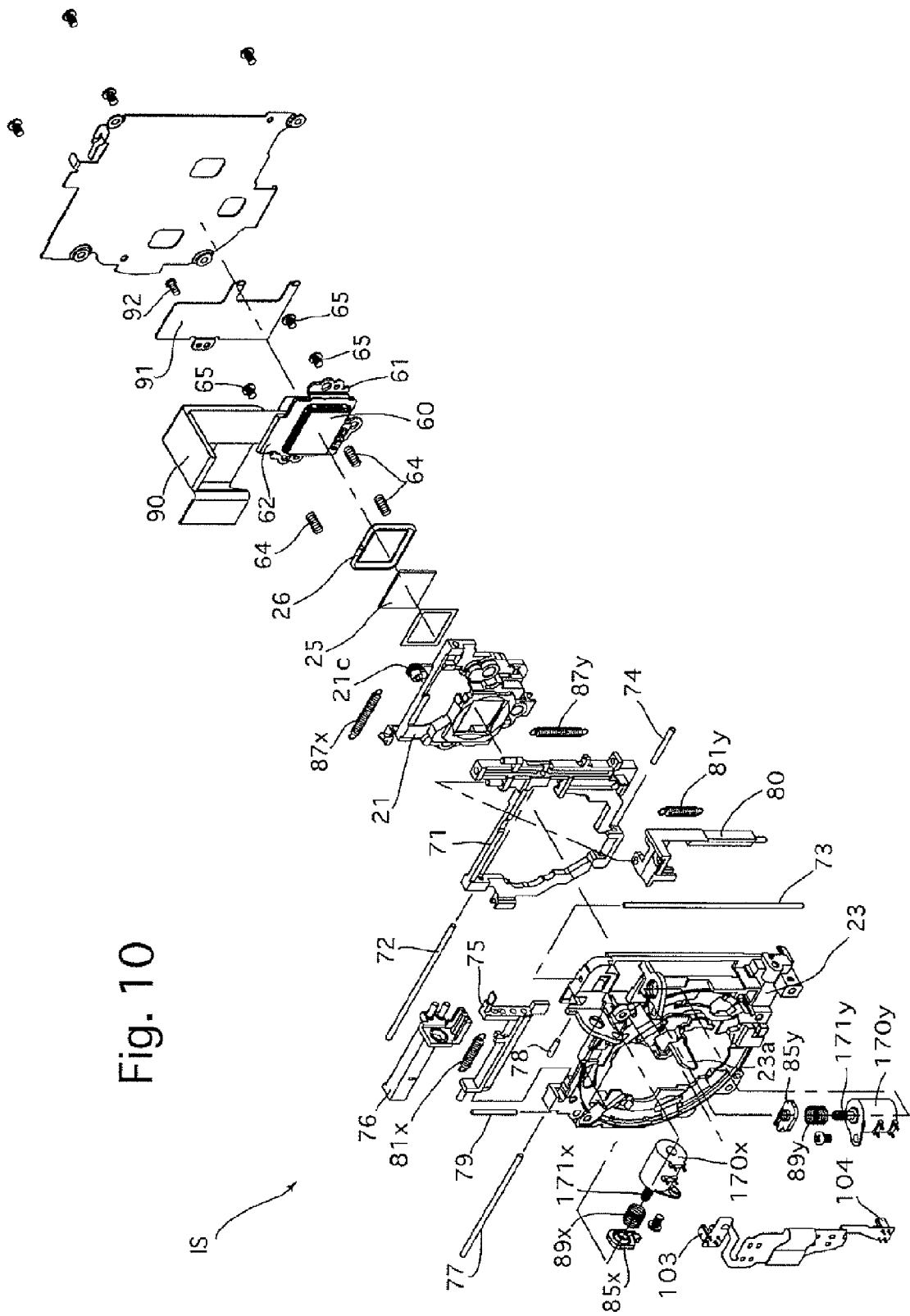
FIG. 10 is an exploded perspective view of the image stabilizing unit.
Figure 25:
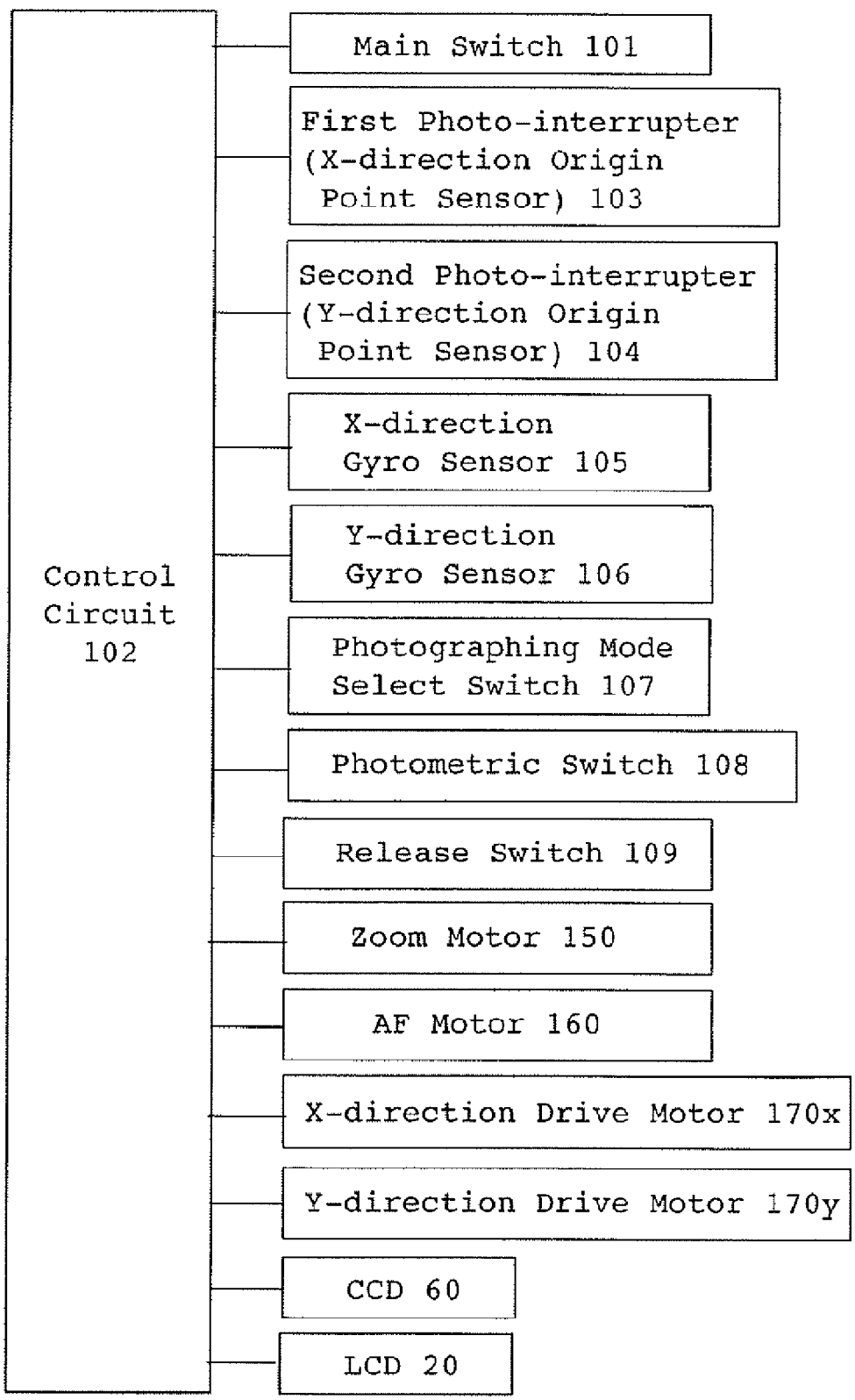
FIG. 25 is a block diagram illustrating a configuration of electrical circuits of the digital camera shown in FIGS. 1 through 3.

The digital camera 200 is provided with an image stabilizer (optical image stabilizer). This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a pair of Y-direction guide rods (guide device) 73 and 79 which extend in the Y-direction (the vertical direction of the digital camera 200). The Y-direction moving stage 71 is provided with a guide hole 71a and a guide groove 71b (see FIG. 16) in which the pair of Y-direction guide rods 73 and 79 are engaged so that the Y-direction moving stage 71 is supported by the pair of Y-direction guide rods 73 and 79 to be freely slidable thereon, respectively. A pair of X-direction guide rods (guide device) 72 and 74 are fixed to the Y-direction moving stage 71 to extend in the X-direction (the horizontal direction of the digital camera 200) that is perpendicular to the Y-direction. The X-direction moving stage 21 is provided with a guide hole 21a and a guide groove 21b (see FIGS. 12 and 13) in which the pair of X-direction guide rods 72 and 74 are engaged so that the X-direction moving stage 21 is freely slidable thereon, respectively. Accordingly, the CCD image sensor 60 is supported by the stationary holder 23 via the Y-direction moving stage 71 and the X-direction moving stage 21 to be movable in two axial directions orthogonal to each other in a plane orthogonal to the photographing optical axis Z1. The range of movement of the X-direction moving stage 21 is defined by inner peripheral surfaces of the Y-direction moving stage 71, while the range of movement of the Y-direction moving stage 71 is defined by inner peripheral surfaces of the stationary holder 23.

The image stabilizing unit IS is provided with an X-direction stage biasing spring 87x which is extended so as to be installed between a spring hook 21v formed on the X-direction moving stage 21 and a spring hook 23vx formed on the stationary holder 23. The X-direction stage biasing spring 87x is an extension coil spring and biases the X-direction moving stage 21 rightward as viewed from the front of the zoom lens 201 (leftward as viewed from the rear of the zoom lens 201). The image stabilizing unit IS is provided with a Y-direction stage biasing spring 87y which is extended so as to be installed between a spring hook 71v formed on the Y-direction moving stage 71 and a spring hook 23vy formed on the stationary holder 23. The Y-direction stage biasing spring 87y is an extension coil spring and biases the Y-direction moving stage 71 downward.

Figure 16:
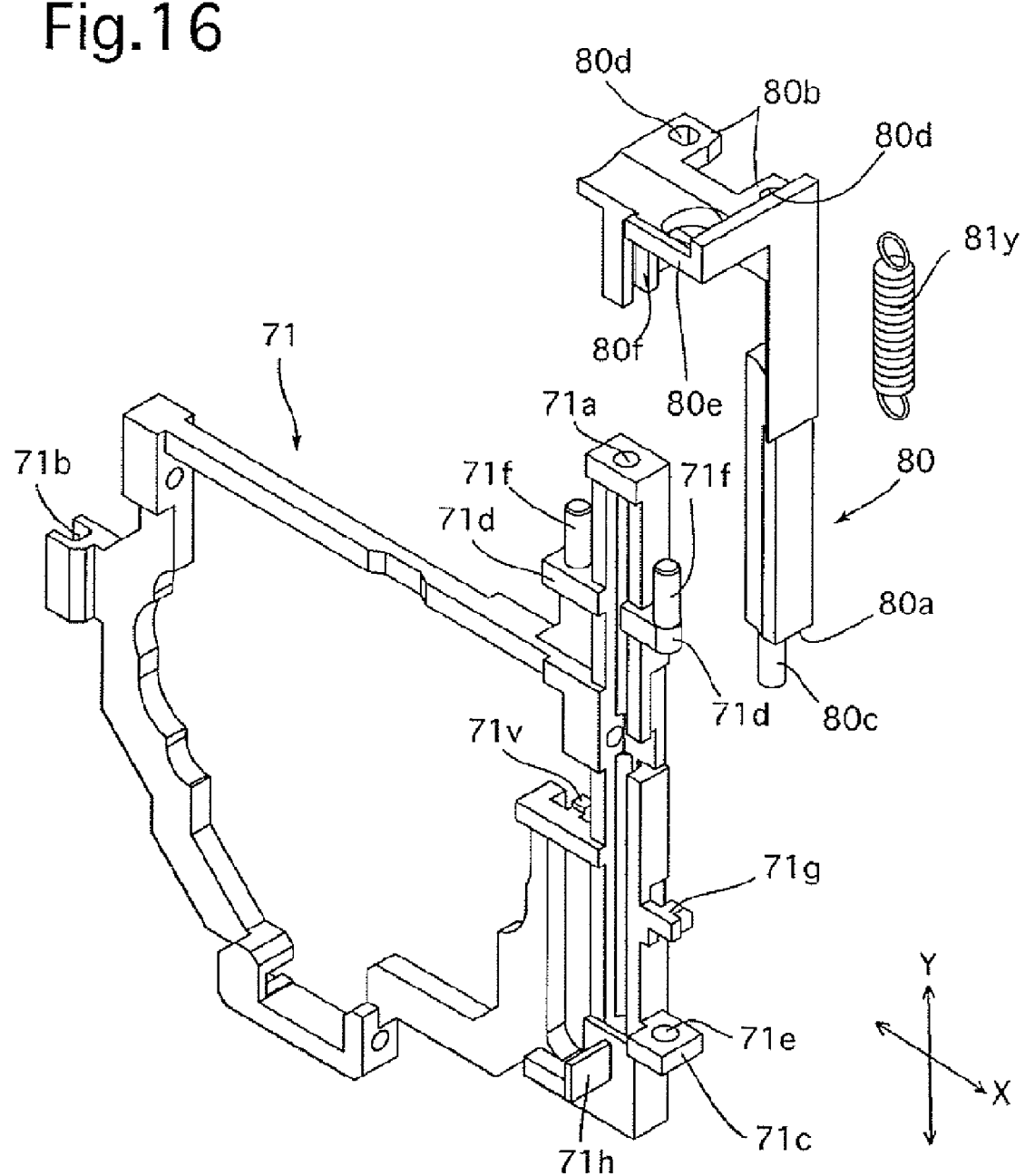
FIG. 16 is an exploded perspective view of a Y-direction moving member, a Y-direction moving stage and an associated extension joining spring of the image stabilizing unit.

As shown in FIGS. 16 and 17, the image stabilizing unit IS is provided on one side of the Y-direction moving stage 71 with a Y-direction moving member 80 which is supported by the Y-direction moving stage 71. The Y-direction moving member 80 is elongated in the Y-direction and provided in the vicinity of upper and lower ends of the Y-direction moving member 80 with movement limit lugs 80b and a movement limit lug 80a, respectively. The Y-direction moving member 80 is provided at a lower end thereof with a guide pin 80c which extends downward from the movement limit lug 80a. The movement limit lugs 80b are provided with a pair of guide holes 80d. The Y-direction moving member 80 is further provided in the vicinity of the pair of guide holes 80d with a nut contacting portion 80e and a linear groove 80f (see FIG. 16), and is further provided, on a vertically straight portion of the Y-direction moving member 80 between the movement limit lug 80a and the movement limit lug 80b, with a spring hook 80g (see FIG. 17). The linear groove 80f is elongated in the Y-direction.

The Y-direction moving stage 71 is provided with a movement limit lug 71c and a movement limit lug 71d which face the movement limit lug 80a and the movement limit lug 80b of the Y-direction moving member 80, respectively. The movement limit lug 71c is provided with a guide hole 71e in which the guide pin 80c is slidably engaged, and the movement limit lug 71d is provided with a pair of guide pins 71f which extend upward to be slidably engaged in the pair of guide holes 80d, respectively. The Y-direction moving stage 71 is provided on a vertically straight portion thereof between the movement limit lug 71c and a movement limit lug 71d, with a spring hook 71g.

The Y-direction moving stage 71 and the Y-direction moving member 80 are guided to be movable relative to each other in the Y-direction by the engagement of the guide hole 71e with the guide pin 80c and the engagement of the pair of guide pins 71f with the pair of guide holes 80d. The image stabilizing unit IS is provided with an extension joining spring 81y which is extended so as to be installed between the spring hook 71g of the Y-direction moving stage 71 and the spring hook 80g of the Y-direction moving member 80. The extension joining spring 81y biases the Y-direction moving stage 71 and the Y-direction moving member 80 in opposite directions to bring the movement limit lug 80a and the movement limit lug 71c into contact with each other and to bring the movement limit lugs 80b and the movement limit lugs 71d into contact with each other, i.e., in opposite directions to move the Y-direction moving stage 71 and the Y-direction moving member 80 upward and downward, respectively.

Figure 14:
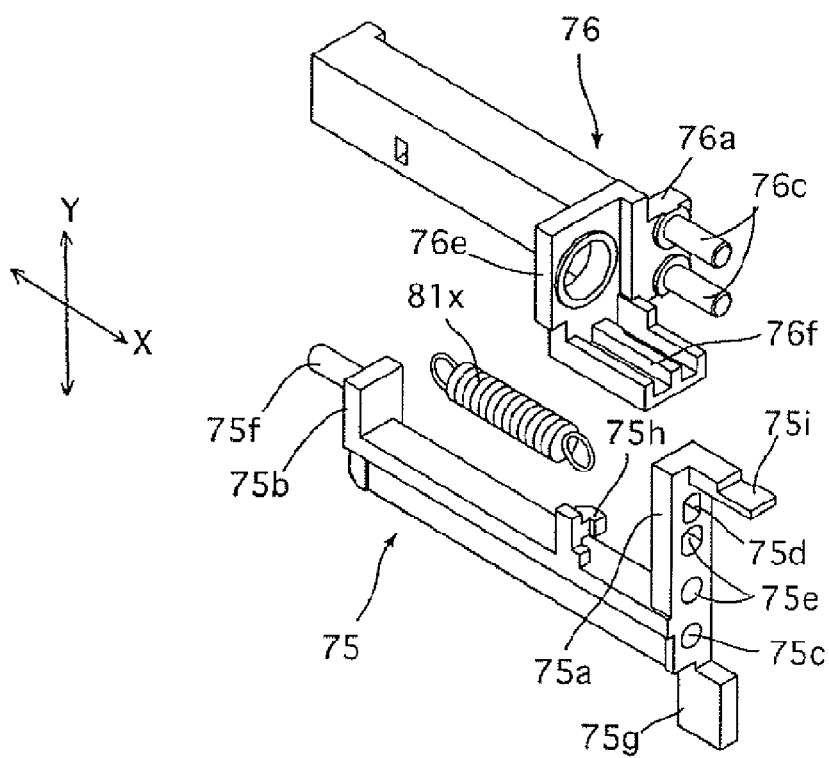
FIG. 14 is a front perspective view of a first X-direction moving member, a second X-direction moving member and an associated extension joining spring of the image stabilizing unit, showing an exploded state thereof.
Figure 15:
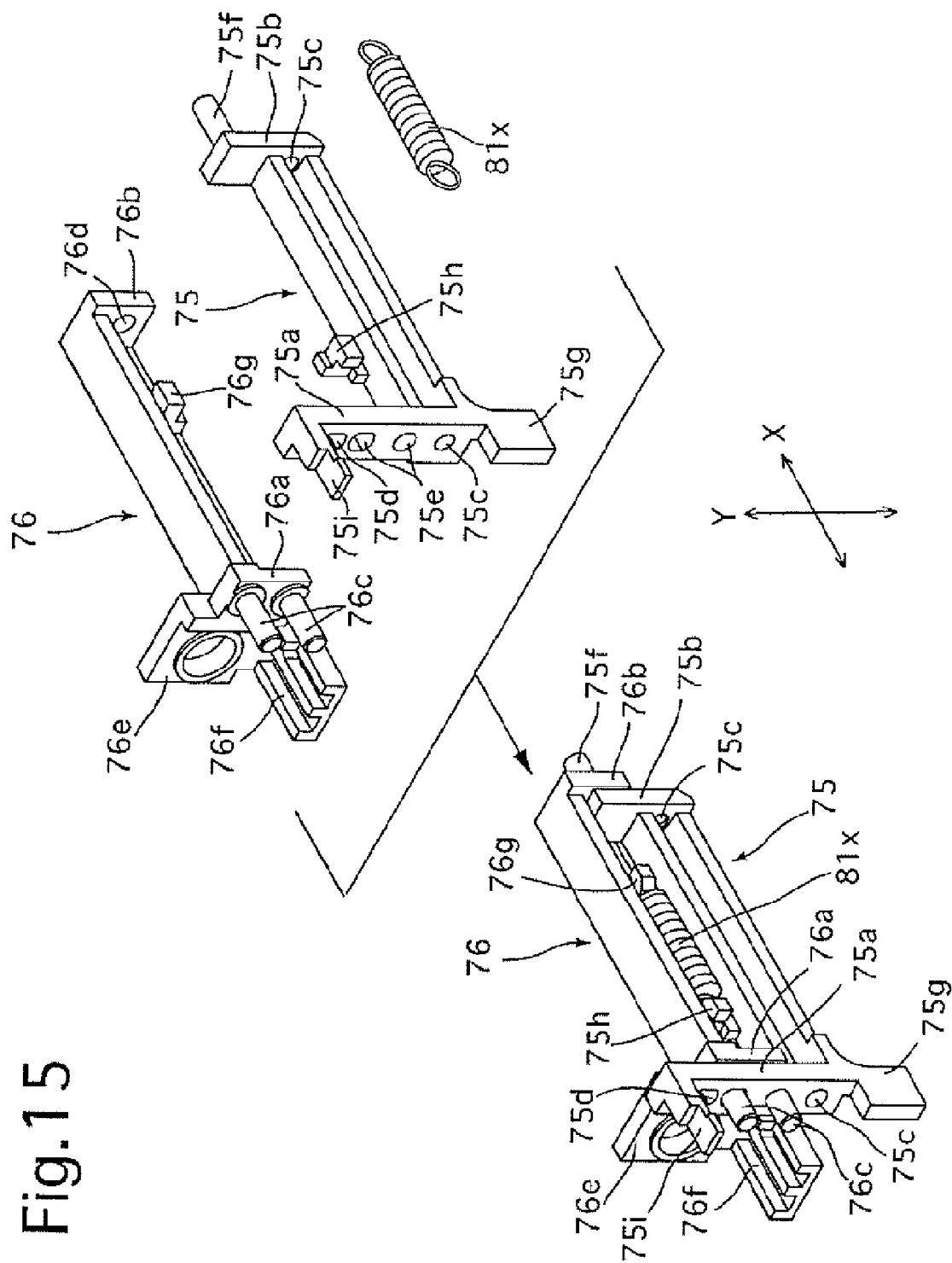
FIG. 15 is a rear perspective view of the first X-direction moving member, the second X-direction moving member and the associated extension joining spring that are shown in FIG. 14, showing an exploded state and an assembled state thereof.

Another pair of X-direction guide rods 77 and 78 that are different from the pair of X-direction guide rods 72 and 74 are fixed to the stationary holder 23 to extend in the X-direction. The image stabilizing unit IS is provided with a first X-direction moving member 75 which is supported by the stationary holder 23 via the pair of X-direction guide rods 77 and 78 to be freely slidable thereon. As shown in FIGS. 14 and 15, the first X-direction moving member 75 is elongated in the X-direction, and is provided, in the vicinity of opposite ends of the First X-direction moving member 75 in the X-direction, with a movement limit Lug 75a and a movement limit lug 75b, respectively. A pair of guide holes 75c in which the X-direction guide rod 77 is inserted are formed on the movement limit lugs 75a and 75b, respectively, and are aligned in the X-direction. A guide hole 75d in which the X-direction guide rod 78 is inserted is formed on the movement limit lug 75a. No guide hole corresponding to the guide hole 75d is formed on the movement limit lug 75b. The movement limit lug 75a is provided between the associated guide hole 75c and the guide hole 75d with a pair of guide holes 75e. The movement limit lug 75b is provided, above the associated guide hole 75c in the Y-direction (see FIG. 15), with a guide pin 75f which extends in the X-direction in a direction away from the movement limit lug 75a. The first X-direction moving member 75 is further provided at the bottom of the movement limit lug 75a with a linkage projection 75g, and is further provided, on a horizontally straight portion of the first X-direction moving member 75 between the movement limit lug 75a and a movement limit lug 75b, with a spring hook 75h.

The image stabilizing unit IS is provided on the first X-direction moving member 75 with a second X-direction moving member 76. The second X-direction moving member 76 is provided with a movement limit lug 76a and a movement limit lug 76b which are separate from each other in the X-direction. The movement limit lug 76a is provided with a pair of guide pins 76c which extend in the X-direction to be slidably engaged with the pair of guide holes 75e of the first X-direction moving member 75, respectively, and the movement limit lug 76b is provided with a guide hole 76d in which the guide pin 75f of the first X-direction moving member 75 is slidably engaged. The second X-direction moving member 76 is further provided in the vicinity of the movement limit lug 76a with a nut contacting portion 76e and a linear groove 76f (see FIG. 15), and is further provided, on a horizontally straight portion of the second X-direction moving member 76 between the movement limit lug 76a and the movement limit lug 76b, with a spring hook 76g. The linear groove 76f is elongated in the X-direction.

The first X-direction moving member 75 and the second X-direction moving member 76 are guided to be movable relative to each other in the X-direction by the engagement of the pair of guide pins 76c with the pair of guide holes 75e and the engagement of the guide pin 75f with the guide hole 76d. The image stabilizing unit IS is provided with an extension joining spring 81x which is extended so as to be installed between the spring hook 75h of the first X-direction moving member 75 and the spring hook 76g of the second X-direction moving member 76. The extension joining spring 31x biases the first X-direction moving member 75 and the second X-direction moving member 76 in opposite directions to bring the movement limit lug 75a and the movement limit lug 76a into contact with each other and to bring the movement limit lug 75b and the movement limit lug 76b into contact with each other.

The linkage projection 75g of the first X-direction moving member 75 is in contact with a transfer roller 21c (see FIGS. 12, 13 and 24) mounted to the X-direction moving stage 21 so that a moving force in the X-direction is transferred from the first X-direction moving member 75 to the X-direction moving stage 21 via the contacting engagement between the linkage projection 75g and the transfer roller 21c. The transfer roller 21c is supported by a rotation pin parallel to the photographing optical axis Z1 so as to be freely rotatable on the rotation pin. When the X-direction moving stage 21 moves with the Y-direction moving stage 71 in the Y-direction, the transfer roller 21c rolls on a contacting surface of the linkage projection 75g. This contacting surface of the linkage projection 75g is a flat surface elongated in the Y-direction, and accordingly, the structure allowing the transfer roller 21c to roll on the contacting surface of the linkage projection 75g makes it possible for the X-direction moving stage 21 to move in the Y-direction without exerting any driving force in the Y-direction to the first X-direction moving member 75.

Figure 11:
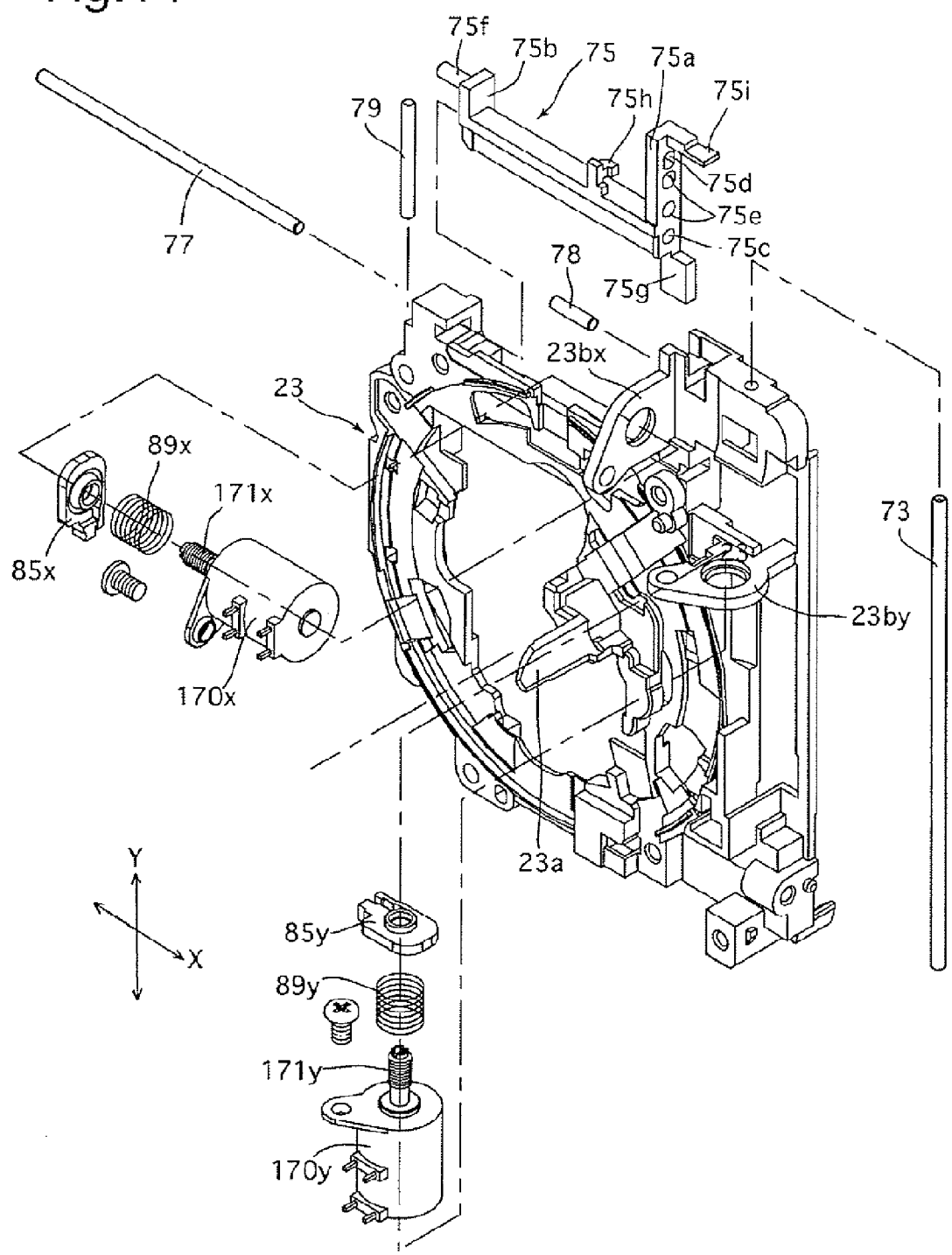
FIG. 11 is an exploded perspective view of a portion of the image stabilizing unit in the vicinity of a stationary holder thereof.
Figure 12:
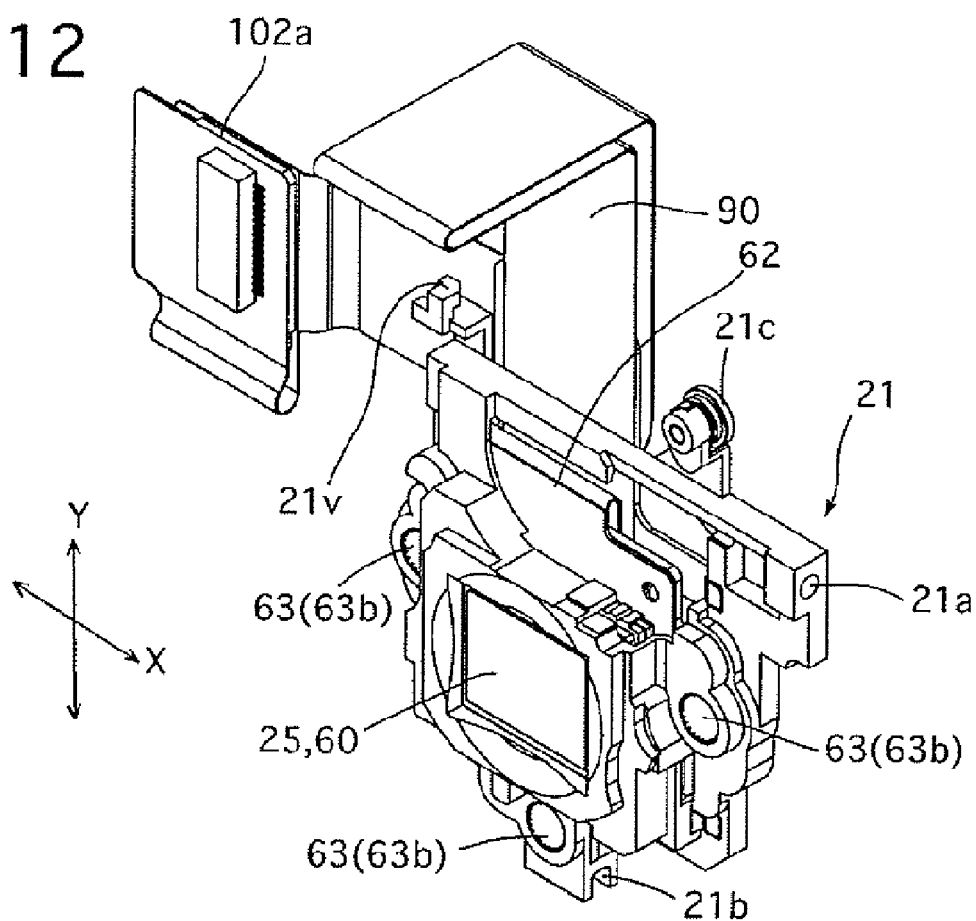
FIG. 12 is a front perspective view of a CCD unit shown in FIG. 10 that includes an X-direction moving stage.
Figure 13:
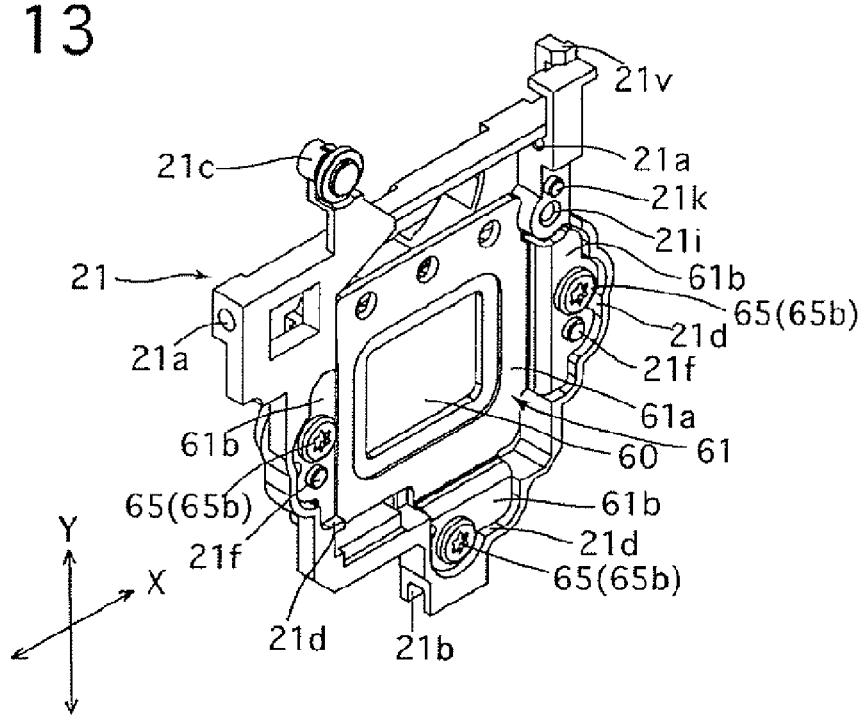
FIG. 13 is a rear perspective view of the CCD unit from which a flexible printed wiring board and a movable plate are removed.

As shown in FIG. 11, the image stabilizing unit IS is provided with an X-direction drive motor 170x serving as a drive source for driving the CCD image sensor 60 in the X-direction and a Y-direction drive motor 170y serving as a drive source for driving the CCD image sensor 60 in the Y-direction. The X-direction drive motor 170x and the Y-direction drive motor 170y are fixed to a motor bracket 23bx and a motor bracket 23by, respectively, which are integrally formed on the stationary holder 23. Each of the X-direction drive motor 170x and the Y-direction drive motor 170y is a stepping motor. A drive shaft (rotary shaft) of the X-direction drive motor 170x is threaded to serve as a feed screw 171x, and a drive shaft (rotary shaft) of the Y-direction drive motor 170y is threaded to serve as a feed screw 171y. The feed screw 171x is screwed into a female screw hole of an X-direction driven nut member 85x and the feed screw 171y is screwed into a female screw hole of a Y-direction driven nut member 85y. The X-direction driven nut member 85x is guided linearly in the X-direction by the linear groove 76f, and is in contact with the nut contacting portion 76e. The Y-direction driven nut member 85y is guided linearly in the Y-direction by the linear groove 80f, and is in contact with the nut contacting portion 80e. The X-direction driven nut member 85x can be screw-disengaged from either end of the feed screw 171x, and the Y-direction driven nut member 85y can be screw-disengaged from either end of the feed screw 171y. A nut-member biasing spring 89x is positioned between the X-direction driven nut member 85x and the X-direction drive motor 170x, and a nut-member biasing spring 89y is positioned between the Y-direction driven nut member 85x and the X-direction drive motor 170y. Each of the nut-member biasing springs 89x and 89y is a compression coil spring which is loosely fitted on the associated feed screw 171x and 171y, respectively, in a compressed state. The nut-member biasing spring 89x biases the X-direction driven nut member 85x in a direction to bring the X-direction driven nut member 85x back into screw engagement with the X-direction drive motor 170x in the case where the X-direction driven nut member 85x is disengaged from the X-direction drive motor 170x toward the X-direction drive motor 170x side. Likewise, the nut-member biasing spring 89y biases the Y-direction driven nut member 85y in a direction to bring the Y-direction driven nut member 85y back into screw engagement with the Y-direction drive motor 170y in the case where the Y-direction driven nut member 85y is disengaged from the Y-direction drive motor 170y toward the Y-direction drive motor 170y side.

Figure 24:
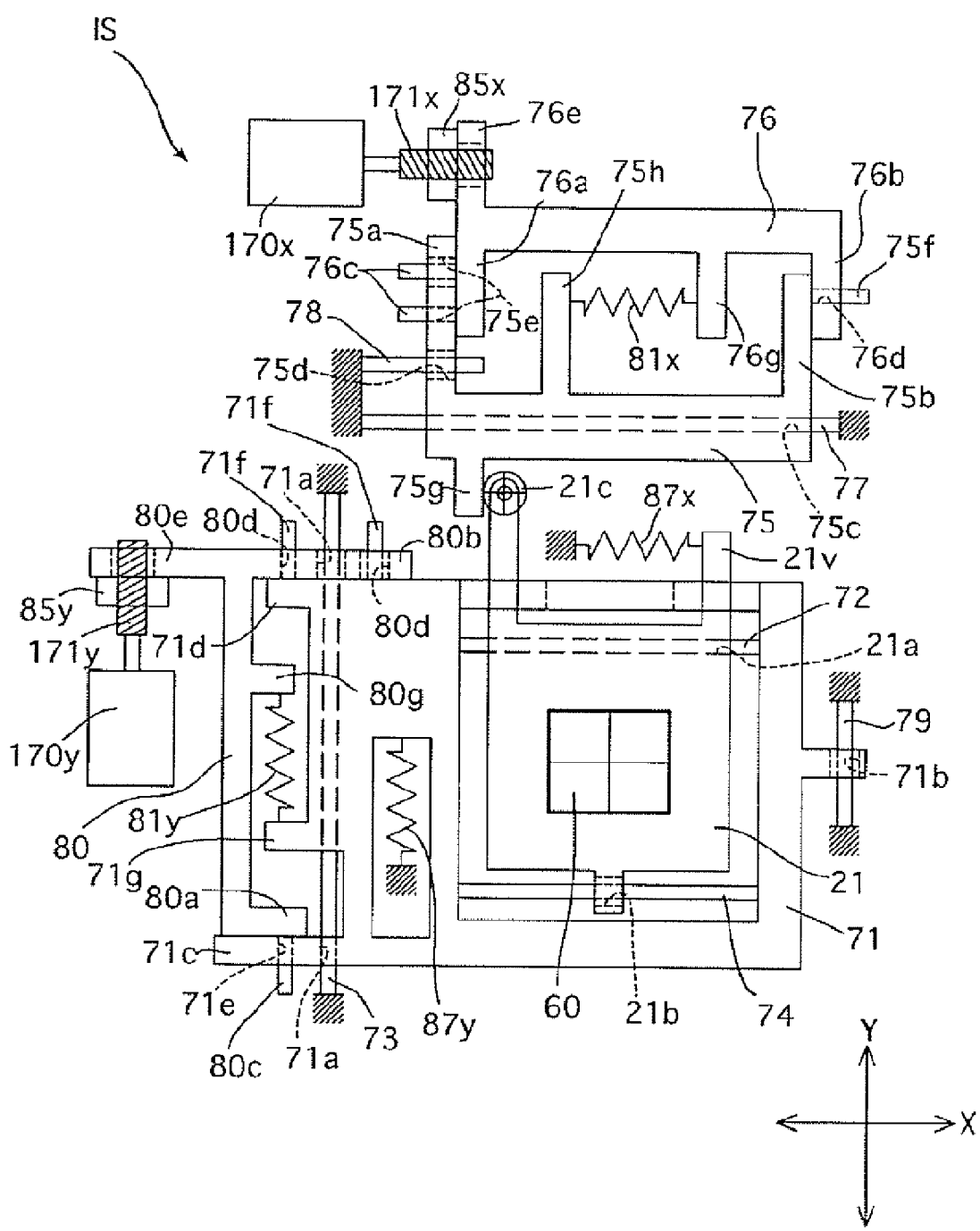
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the X-direction guide rod 78 and the pair of guide pins 76c, etc., are different from those shown in FIGS. 7 through 23 for the purpose of illustration. As can be understood from FIG. 24, in the driving mechanism for driving the CCD image sensor 60 in the X-direction, the first X-direction moving member 75 and the second X-direction moving member 76 are coupled to each other resiliently by the biasing force of the extension joining spring 81x with the movement limit lug 75a and the movement limit lug 75b in contact with the movement limit lug 76a and the movement limit lug 76b, respectively. The biasing force of the X-direction stage biasing spring 87x is exerted on the first X-direction moving member 75 via the transfer roller 21c, which is in contact with the linkage projection 75g. Although the biasing force of the X-direction stage biasing spring 87x is exerted on the first X-direction moving member 75 leftward as viewed in FIG. 24, i.e., in a direction to disengage the movement limit lugs 75a and 75b from the movement limit lugs 76a and 76b, respectively, the biasing force (spring force) of the extension joining spring 81x is predetermined to be greater than that of the X-direction stage biasing spring 87x. Therefore, the first X-direction moving member 75 and the second X-direction moving member 76 are collectively biased leftward as viewed in FIG. 24 while maintaining the movement limit lugs 75a and 75h in resilient contact with the movement limit lugs 76a and 76b, respectively. Since the leftward movement of the second X-direction moving member 76 is limited by the engagement of the nut contacting portion 76e with the X-direction driven nut member 85x, the position of the X-direction driven nut member 85x serves as a reference position for each of the first X-direction moving member 75 and the second X-direction moving member 76 in the X-direction. As can be seen in FIG. 24, the end of the feed screw 171x extends through a through-hole (see FIGS. 14 and 15) formed on the nut contacting portion 76e so as not to interfere therewith.

Driving the X-direction drive motor 170x to rotate the drive shaft thereof (the feed screw 171x) causes the X-direction driven nut member 85x, that is screw-engaged with the feed screw 171x, to move linearly in the X-direction, thus causing the relative position between the first X-direction moving member 75 and the second X-direction moving member 76 in the X-direction to vary. For instance, if the X-direction driven nut member 85x is moved rightward with respect to the view shown in FIG. 24, the X-direction driven nut member 85x presses the nut contacting portion 76e in the rightward direction to thereby integrally move the first X-direction moving member 75 and the second X-direction moving member 76 rightward as viewed in FIG. 24 against the spring force of the X-direction stage biasing spring 87x. It the first X-direction moving member 75 is moved rightward with respect to the view shown in FIG. 24, the linkage projection 75g presses the transfer roller 21c in the rightward direction to thereby move the X-direction moving stage 21 rightward with respect to the view shown in FIG. 24. Conversely, if the X-direction driven nut member 85x is moved leftward with respect to the view shown in FIG. 24, the first X-direction moving member 75 and the second X-direction moving member 76 follow the X-direction driven nut member 85x to integrally move leftward with respect to the view shown in FIG. 24 by the biasing force of the X-direction stage biasing spring 87x. At this time, the X-direction moving stage 21 follows the first X-direction moving member 75 to move leftward as viewed in FIG. 24 due to the biasing force of the X-direction stage biasing spring 87x. The linkage projection 75g and the transfer roller 21c are maintained in contact with each other at all times by the biasing force of the X-direction stage biasing spring 87x.

In the driving mechanism for driving the CCD image sensor 60 in the Y-direction, the Y-direction moving stage 71 and the Y-direction moving member 80 are resiliently coupled to each other via the extension joining spring 81y with the movement limit lugs 71c and 71d being in contact with the movement limit lugs 80a and 80b, respectively. Although the Y-direction moving stage 71 is biased downward as viewed in FIG. 24 by the spring force of the Y-direction stage biasing spring 87y, i.e., in a direction to disengage the movement limit lugs 71c and 71d from the movement limit lugs 80a and 80b, respectively, the biasing force (spring force) of the extension joining spring 81y is predetermined to be greater than that of the Y-direction stage biasing spring 87y. Therefore, the Y-direction moving stage 71 and the Y-direction moving member 80 are collectively biased downward while maintaining the movement limit lugs 71c and 71d in resilient contact with the movement limit lugs 80a and 80b, respectively. Since the downward movement of the Y-direction moving member 80 is limited by the engagement of the nut contacting portion 80e with the Y-direction driven nut member 85y, the position of the Y-direction driven nut member 85y serves as a reference position for each of the Y-direction moving stage 71 and the Y-direction moving member 80 in the Y-direction. As can be seen in FIG. 24, the end of the feed screw 171y extends through a through-hole (see FIGS. 16 and 17) formed in the nut contacting portion 80e so as not to interfere therewith.

Driving the Y-direction drive motor 170y to rotate the drive shaft thereof (the feed screw 171y) causes the Y-direction driven nut member 85y, that is screw-engaged with the feed screw 171y, to move linearly in the Y-direction, thus causing the relative position between the Y-direction moving stage 71 and the Y-direction moving member 80 in the Y-direction to vary. For instance, if the Y-direction driven nut member 85y is moved upward with respect to the view shown in FIG. 24, the Y-direction driven nut member 85y presses the nut contacting portion 80e in the upward direction to thereby integrally move the Y-direction moving stage 71 and the Y-direction moving member 80 upward with respect to the view shown in FIG. 24 against the spring force of the Y-direction stage biasing spring 87y. Conversely, if the Y-direction driven nut member 85y is moved downward with respect to the view shown in FIG. 24, the Y-direction moving stage 71 and the Y-direction moving member 80 follow the Y-direction driven nut member 85y to integrally move downward by the biasing force of the Y-direction stage biasing spring 87y.

When the Y-direction moving stage 71 moves in the Y-direction, the X-direction moving stage 21 that is supported by the Y-direction moving stage 71 thereon moves together with the Y-direction moving stage 71. On the other hand, when the X-direction moving stage 21 moves together with the Y-direction moving stage 71 vertically in the Y-direction, the contacting point between the transfer roller 21c and the contacting surface of the linkage projection 75g varies because the first X-direction moving member 75, with which the transfer roller 21c is in contact, does not move in the Y-direction. During this movement, the transfer roller 21c rolls on the contacting surface of the linkage projection 75g so that the X-direction moving stage 21 can be moved in the Y-direction without exerting any driving force on the first X-direction moving member 75 in the Y-direction.

According to the above described structure of the image stabilizing unit IS, the X-direction moving stage 21 can be moved forward and reverse in the X-direction by driving the X-direction drive motor 170x forward and reverse, respectively, and the Y-direction moving stage 71, together with the X-direction moving stage 21 that is supported by the Y-direction moving stage 71, can be moved forward and reverse in the Y-direction by driving the Y-direction drive motor 170y forward and reverser respectively.

Figure 19:
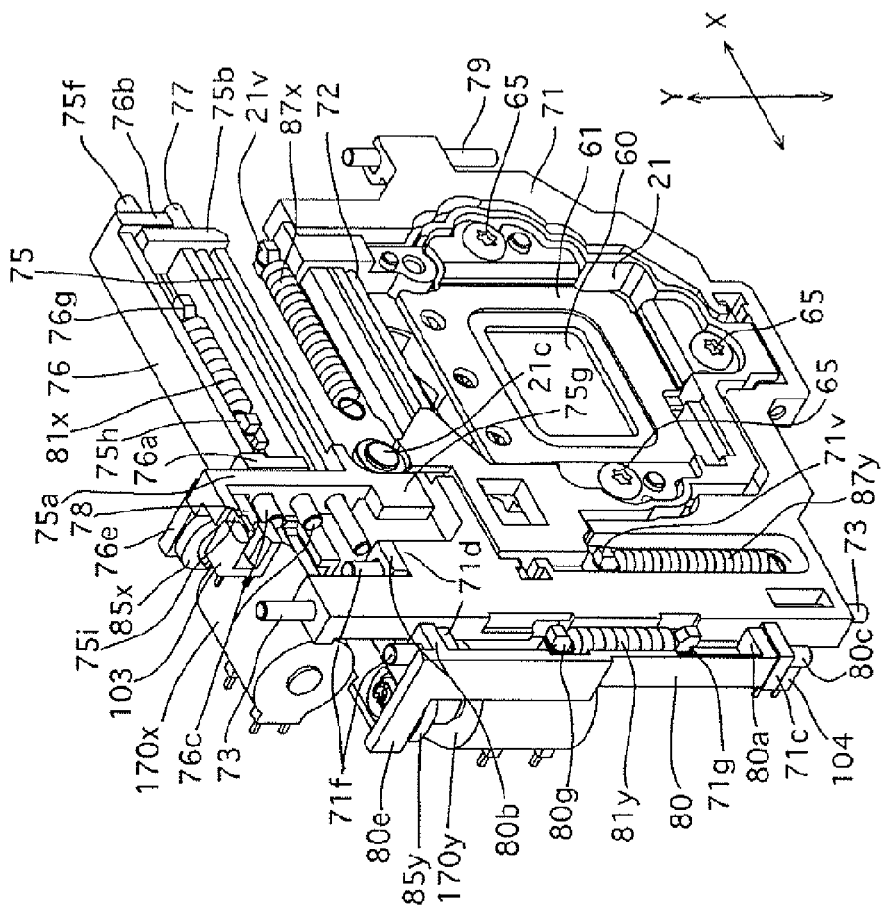
FIG. 19 is a rear perspective view of the elements of the image stabilizing unit shown in FIG. 18.
Figure 18:
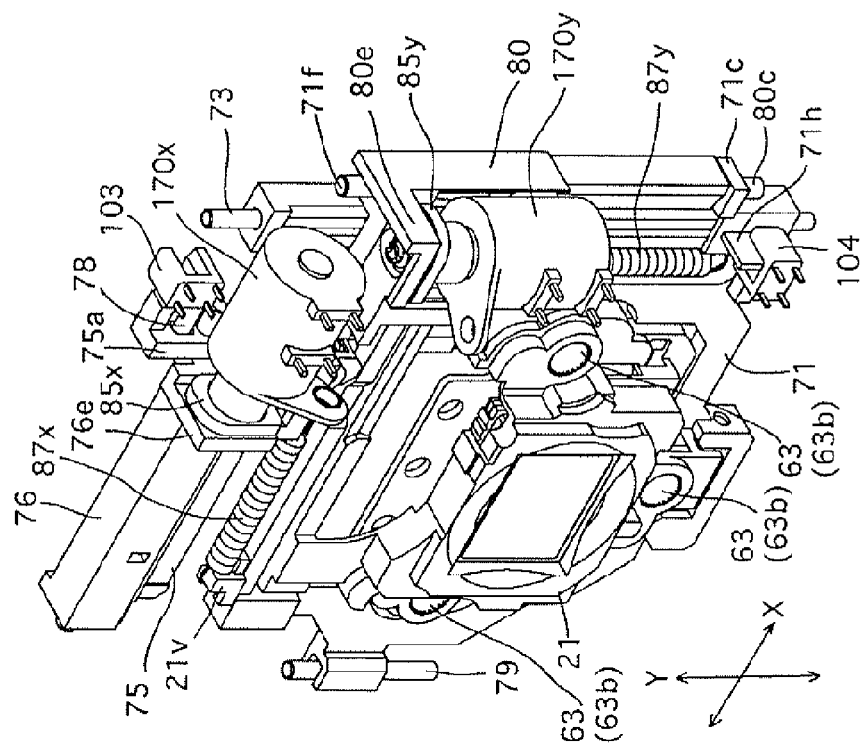
FIG. 18 is a front perspective view of the image stabilizing unit from which the stationary holder is removed.
Figure 21:
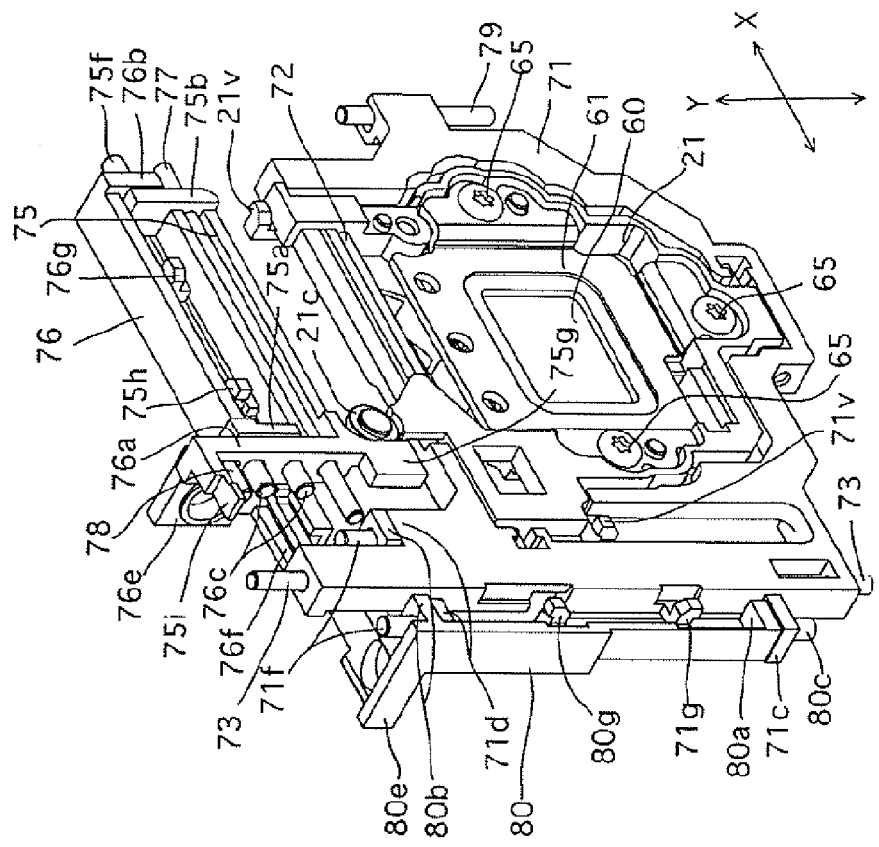
FIG. 21 is a rear perspective view of the elements of the image stabilizing unit shown in FIG. 20.
Figure 20:
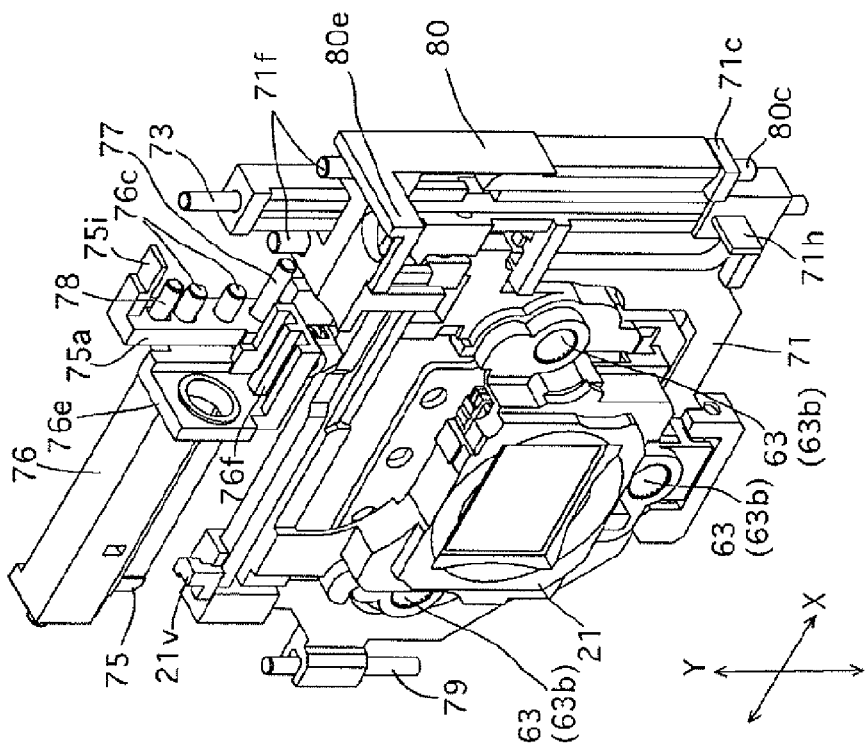
FIG. 20 is a front perspective view of the elements of the image stabilizing unit shown in FIGS. 18 and 19 from which drive motors, photo-interrupters and biasing springs are further removed.
Figure 23:
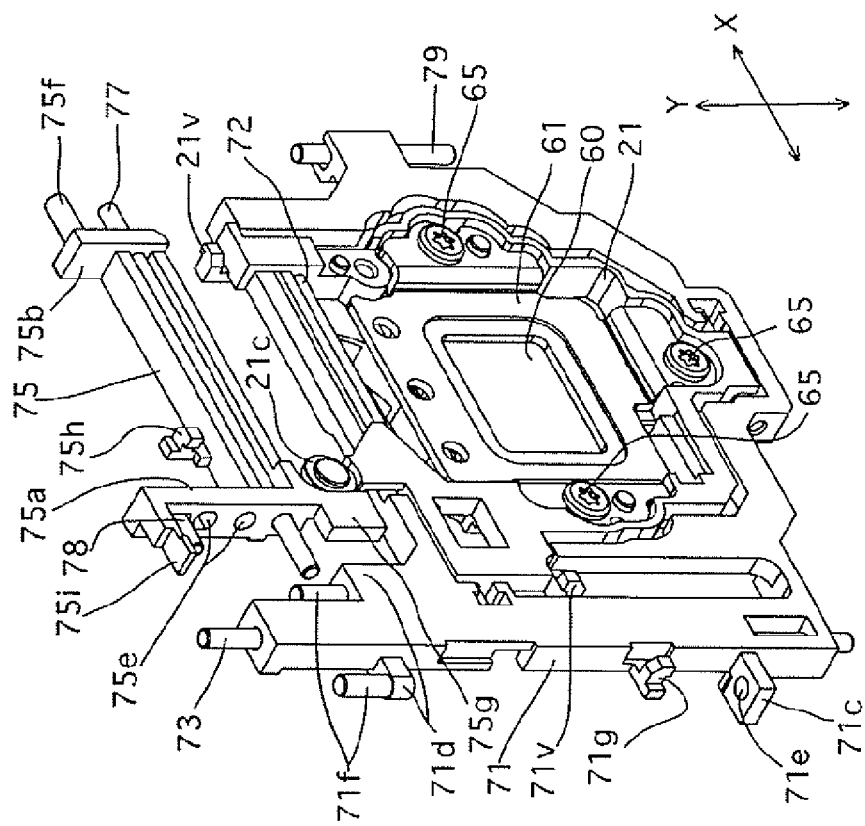
FIG. 23 is a rear perspective view of the elements of the image stabilizing unit shown in FIG. 22.
Figure 22:
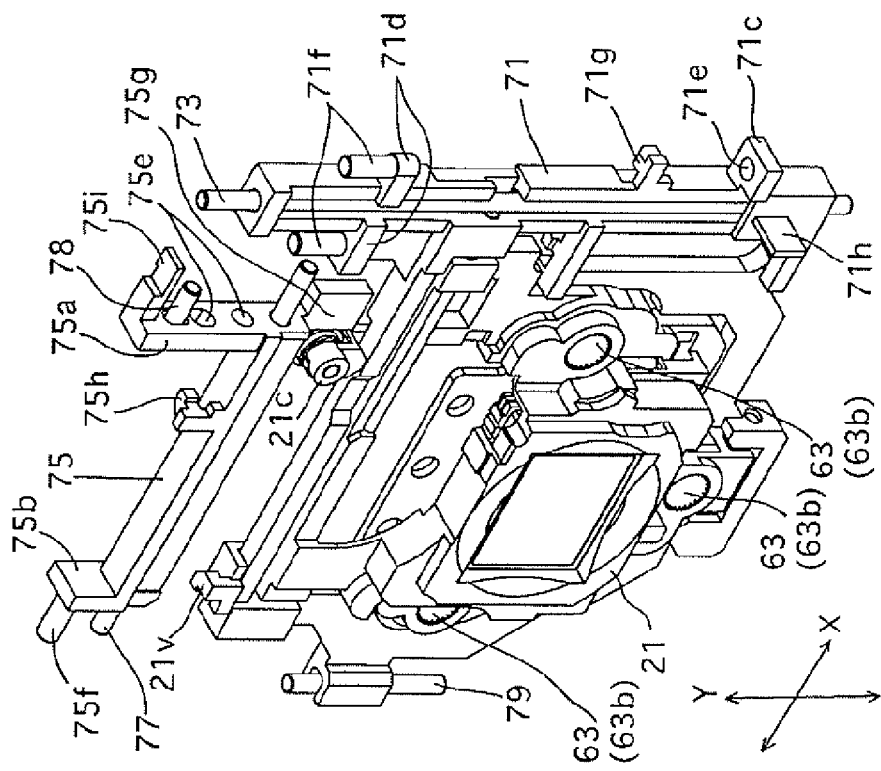
FIG. 22 is a front perspective view of the elements of the image stabilizing unit shown in FIGS. 20 and 21 from which the second X-direction moving member and the Y-direction moving member are further removed.

As shown in FIGS. 14 and 15, the first X-direction moving member 75 is provided in the vicinity of the movement limit lug 75a with a position detection lug 75i in the shape of a small thin plate. As shown in FIG. 16, the Y-direction moving stage 71 is provided in the vicinity of the movement limit lug 71c with a position detection lug 71h in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75i of the first X-direction moving member 75 that passes between mutually facing emitter/receiver elements when the light beam is blocked by the position detection lug 75i. Likewise, the second photo-interrupter 104 detects the presence of the position detection lug 71h of the Y-direction moving stage 71 that passes between mutually facing emitter/receiver elements when the light beam is blocked by the position detection lug 71h. The initial position of the first X-direction moving member 75 (the X-direction moving stage 21) in the X-direction can be detected by detecting the presence of the position detection lug 75i by the first photo-interrupter 103, and the initial position of the Y-direction moving stage 71 in the Y-direction can be detected by detecting the presence of the position detection lug 71h by the second photo-interrupter 104.

As shown in the block diagram in FIG. 25, the digital camera 200 is provided with an X-direction gyro sensor (angular velocity sensor) 105 and a Y-direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-direction and in the Y-direction. The control circuit 102 further calculates the driving amounts and the driving directions of the X-direction moving stage 21 (the first X-direction moving member 75 and the second X-direction moving member 76) and the Y-direction moving stage 71 (the Y-direction moving member 80) for the respective axial directions (driving pulses for the X-direction drive motor 170x and the Y-direction drive motor 17y) in order to counteract camera shake.

Thereupon, the X-direction drive motor 170x and the Y-direction drive motor 170y are actuated and the operations thereof are controlled in accordance with the calculated values, which counteracts image shake of an object image captured by the CCD image sensor 60. The digital camera 200 can be put into this image stabilization mode by turning on a photographing mode select switch 107 (see FIG. 25). If the photographing mode select switch 107 is in an off-state, the image stabilizing capability is deactivated so that a normal photographing operation is performed. Additionally, by operating the photographing mode select switch 107, either a first tracking mode or a second tracking mode can be selected in the image stabilization mode. The image stabilizing capability remains activated by driving the X-direction drive motor 170x and the Y-direction drive motor 170y in the first tracking mode, while the image stabilizing capability is activated by driving the X-direction drive motor 170x and the Y-direction drive motor 170y only when a photometric switch 108 or a release switch 109 (see FIG. 25) provided in the digital camera 200 is turned ON in the second tracking mode. The photometric switch 108 is turned ON by depressing the shutter button 205 halfway, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-direction drive motor 170x and the Y-direction drive motor 170y to the CCD image sensor 60 (the X-direction moving stage 21) to prevent damage to the feed screws 171x and 171y and other associated elements. This damage-protection structure is composed of two major components: a first component composed of the first X-direction moving member 75 and the second X-direction moving member 76 (which are resiliently coupled to each other by the extension joining spring 81x) in the driving mechanism for driving the CCD image sensor 60 in the X-direction and a second component composed of the Y-direction moving stage 71 and the Y-direction moving member 80 (which are resiliently coupled to each other by the extension joining spring 81y) in the driving mechanism for driving the CCD image sensor 60 in the Y-direction.

The driving mechanism for driving the CCD image sensor 60 in the X-direction has the capability of protecting itself from damage. This capability will be discussed hereinafter.

For instance, when the X-direction driven nut member 85x is moved rightward with respect to the view shown in FIG. 24 by the X-direction drive motor 170x, the first X-direction moving member 75 and the second X-direction moving member 76, which move integrally in a normal state, move relative to each other in the X-direction so as to disengage the movement limit lug 75a and the movement limit lug 76a (and also the movement limit lug 75b and the movement limit lug 76b) from each other against the biasing force of the extension joining spring 81x in the event of the X-direction moving stage 21 abutting against the Y-direction moving stage 71 upon reaching a mechanical limit of movement of the X-direction moving stage 21 or other causes which interfere with movement of the X-direction moving stage 21. Specifically, the second X-direction moving member 76 can solely move rightward in the X-direction relative to the first X-direction moving member 75 in the case where movement of the first X-direction moving member 75, together with the X-direction moving stage 21, is prevented for some reason. This structure makes it possible for the X-direction driven nut member 85x to move along the feed screw 171x even if the X-direction moving stage 21 becomes immobilized. This prevents excessive loads on the aforementioned driving force transfer mechanism, thus preventing thread jamming between the feed screw 171x and the X-direction driven nut member 85x and further preventing damage to other associated parts of the driving force transfer mechanism when the X-direction driven nut member 85x is moved leftward with respect to the view shown in FIG. 24 by the X-direction drive motor 170x, the X-direction driven nut member 85x moves in a direction away from the nut contacting portion 76e, and accordingly, the driving force of the X-direction drive motor 170x does not act on either the first X-direction moving member 75 or the second X-direction moving member 76; hence, no undue loads are exerted on the driving force transfer mechanism even if movement of the X-direction moving stage 21 is prevented for some reason.

Similar to the driving mechanism for driving the CCD image sensor 60 in the X-direction, the driving mechanism for driving the CCD image sensor 60 in the Y-direction also has the capability of protecting itself from damage. This capability will be discussed hereinafter. For instance, when the Y-direction driven nut member 85y is moved upward with respect to the view shown in FIG. 24 by the Y-direction drive motor 170y, the Y-direction moving member 80 and the Y-direction moving stage 71, which move integrally in a normal state, move relative to each other in the Y-direction to disengage the movement limit lug 71c and the movement limit lug 30a (and also the movement limit lug 71d and the movement limit lug 80b) away from each other against the biasing force of the extension joining spring 81y in the event of the Y-direction moving stage 71 abutting against the stationary holder 23 upon reaching a mechanical limit of movement of the Y-direction moving stage 71 or other causes which interfere with movement of the Y-direction moving stage 71 (or the X-direction moving stage 21). Specifically, the Y-direction moving member 80 can solely move upward in the Y-direction relative to the Y-direction moving stage 71 in the case where movement of the Y-direction moving stage 71 is prevented for some reason. This structure makes it possible for the Y-direction driven nut member 85y to move along the feed screw 171y even if the Y-direction moving stage 71 becomes immobilized. This prevents excessive loads on the aforementioned driving force transfer mechanism, thus preventing thread jamming between the feed screw 171y and the Y-direction driven nut member 85y and further preventing damage to other associated parts of the driving force transfer mechanism. When the Y-direction driven nut member 85y is moved downward with respect to the view shown in FIG. 24 by the Y-direction drive motor 170y, the Y-direction driven nut member 85y moves in a direction away from the nut contacting portion 80e, and accordingly, the driving force of the Y-direction drive motor 170y does not act on either the Y-direction moving member 80 or the Y-direction moving stage 71; hence, no undue loads are exerted on the driving force transfer mechanism even if movement of the Y-direction moving stage 71 is prevented for some reason.

As mentioned above, the range of movement of the X-direction moving stage 21 is defined by inner peripheral surfaces of the Y-direction moving stage 71, while the range of movement of the Y-direction moving stage 71 is defined by inner peripheral surfaces of the stationary holder 23. Namely, the mechanical limits of movement of the X-direction moving stage 21 in the X-direction are defined by inner peripheral surfaces of the Y-direction moving stage 71, while the mechanical limits of movement of the Y-direction moving stage 71 in the Y-direction are defined by inner peripheral surfaces of the stationary holder 23. It is desirable that the driving force of the X-direction drive motor 170x be stopped being transferred from the feed screw 171x to the X-direction driven nut member 85x upon the X-direction moving stage 21 reaching either of the right and left limits of movement thereof, and that the driving force of the Y-direction drive motor 170y be stopped being transferred from the feed screw 171y to the Y-direction driven nut member 85y upon the Y-direction moving stage 71 reaching either of the upper and lower limits of movement thereof. However, taking manufacturing tolerances of the associated components into consideration, such an ideal correlation cannot be always achieved. For instance, if the X-direction driven nut member 85x and the feed screw 171x (or the Y-direction driven nut member 85y and the feed screw 171y) are still screw-engaged with each other by a sufficient axial length in a state where the X-direction moving stage 21 (or the Y-direction moving stage 71) has reached a mechanical limit of movement thereof, there will be a possibility of jamming occurring between the feed screw 171x and the X-direction driven nut member 85x (or the feed screw 171y and the Y-direction driven nut member 85y) due to toads placed on each of the X-direction driven nut member 85x and the feed screw 171x (or the Y-direction driven nut member 85y and the feed screw 171y) by a further rotation of the X-direction drive motor 170x (or the Y-direction drive motor 170y) if the image stabilizer of the digital camera 200 incorporates no damage-protection structure such as the above described damage-protection structure. To prevent this problem from occurring, the image stabilizing mechanism can be constructed so that the X-direction driven nut member 85x (the Y-direction driven nut member 85y) is disengaged from the feed screw 171x (171y) to come off upon reaching either end of the feed screw 171x (171y) after giving the X-direction driven nut member 85x (the Y-direction driven nut member 85y) a sufficient range of movement on the feed screw 171x (171y) so that the X-direction moving stage 21 (the Y-direction moving stage 71) cannot reach a mechanical limit of movement thereof easily. However, according to this structure, the range of movement of each of the X-direction moving stage 21 and the Y-direction moving stage 71 is required to be increased more than necessary, which may undesirably increase the size of the whole image stabilizer. Additionally, if the X-direction moving stage 21 or the Y-direction moving stage 71 is jammed accidentally at some middle point in the range of movement thereof (i.e., not at either end of the range of movement thereof), heavy loads are put on the screw-engaged portion between the X-direction driven nut member 85x (or the Y-direction driven nut member 85y) and the feed screw 171x (or 171y), regardless of the range of movement of the X-direction moving stage 21 or the Y-direction moving stage 71. Conversely, according to the above illustrated embodiment of the image stabilizer, a difference in amount of movement in the X-direction between the X-direction driven nut member 85x and the X-direction moving stage 21 is absorbed by intermediate members (i.e., the first X-direction moving member 75 and the second X-direction moving member 76), while a difference in amount of movement in the Y-direction between the Y-direction driven nut member 85y and the X-direction moving stage 21 is absorbed by intermediate members (i.e., the Y-direction moving stage 71 and the Y-direction moving member 80), and therefore, the range of movement of each of the X-direction moving stage 21 and the Y-direction moving stage 71 does not need to be increased more than necessary.

Moreover, even if the X-direction moving stage 21 or the Y-direction moving stage 71 is jammed accidentally at some middle point in the range of movement thereof (i.e., not at either end of the range of movement thereof), no heavy loads are applied on the screw-engaged portion between the X-direction driven nut member 85x (or the Y-direction driven nut member 85y) and the feed screw 171x (or 171y) because a difference in amount of movement in the X-direction between the X-direction driven nut member 85x and the X-direction moving stage 21 (or a difference in amount of movement in the Y-direction between the X-direction driven nut member 85y and the Y-direction moving stage 21) is absorbed by the aforementioned intermediate members (the first X-direction moving member 75 and the second X-direction moving member 76, or the Y-direction moving stage 71 and the Y-direction moving member 80). In the present embodiment of the image stabilizer, the maximum amount of relative movement between the first X-direction moving member 75 and the second X-direction moving member 76 is predetermined to be capable of absorbing any difference in amount of movement between the X-direction driven nut member 85x and the X-direction moving stage 21 wherever each of the X-direction driven nut member 85x and the X-direction moving stage 21 may be positioned in the range of movement thereof. Likewise, the maximum amount of relative movement between the Y-direction moving stage 71 and the Y-direction moving member 80 is predetermined to be capable of absorbing any difference in amount of movement between the Y-direction driven nut member 85y and the Y-direction moving stage 71 wherever each of the Y-direction driven nut member 85y and the Y-direction moving stage 71 may be positioned in the range of movement thereof.

A restriction on movement on the X-direction moving stage 21 or the Y-direction moving stage 71 is not the only cause of imposing loads on the driving force transfer mechanism. Since the CCD image sensor 60, that serves as an optical element for counteracting image shake, is supported to be freely movable in the X-direction and the Y-direction, there is a possibility of the X-direction moving stage 21 (which holds the CCD image sensor 60) or the Y-direction moving stage 71 (which holds the X-direction moving stage 21) being subjected to a force which forces the X-direction moving stage 21 or the Y-direction moving stage 71 to move even though no driving force is applied thereto by the X-direction drive motor 170x or the Y-direction drive motor 170y, respectively, in the case where a shock or sudden impact is applied to the digital camera 200 when the digital camera 200 is, e.g., dropped to the ground. Even in such a case, such loads, shock or sudden impact can be reliably absorbed in the present embodiment of the image stabilizer.

For instance, if the X-direction moving stage 21 is moved leftward with respect to the view shown in FIG. 24 by an external force other than the driving force of the X-direction drive motor 170x, the first X-direction moving member 75 is pressed in the same direction via the transfer roller 21c. Since this direction of pressing the first X-direction moving member 75 is a direction which disengages the movement limit lugs 75a and 75b from the movement limit lugs 76a and 76b, respectively, the first X-direction moving member 75 can solely move leftward relative to the second X-direction moving member 76 against the biasing force of the extension joining spring 81x. During this movement, the first X-direction moving member 75 does not mechanically press the second X-direction moving member 76, so that only a resilient tensile force of the extension joining spring 81x acts on the second X-direction moving member 76, and accordingly, no excessive force is applied to the X-direction driven nut member 85x from the second X-direction moving member 76. If the X-direction moving stage 21 is moved rightward with respect to the view shown in FIG. 24 by an external force other than the driving force of the X-direction drive motor 170x, the X-direction moving stage 21 moves in a direction to disengage the transfer roller 21c from the linkage projection 75g, and either the first X-direction moving member 75 or the second X-direction moving member 76 is subjected to the moving force of the X-direction moving stage 21. Namely, even if the X-direction moving stage 21 is forced to move forward or reverse in the X-direction by an external force or the like when the X-direction drive motor 170x is not in operation, no undue loads are exerted on the screw-engaged portion between the X-direction driven nut member 85x and the feed screw 171x.

On the other hand, if the Y-direction moving stage 71 is moved downward with respect to the view shown in FIG. 24 by an external force other than the driving force of the Y-direction drive motor 170y, this moving direction of the Y-direction moving stage 71 is a direction which disengages the movement limit lugs 80a and 80b from the movement limit lugs 71c and 71d, respectively, and accordingly, the Y-direction moving stage 71 can solely move downward relative to the Y-direction moving member 80 against the biasing force of the extension joining spring 81y. During this movement the Y-direction moving stage 71 does not mechanically press the Y-direction moving member 80, so that only a resilient tensile force of the extension joining spring 81y acts on the Y-direction moving member 80, and accordingly, no excessive force is applied to the Y-direction driven nut member 85y from the Y-direction moving member 80. If the X-direction moving stage 21 is moved upward with respect to the view shown in FIG. 24 by an external force other than the driving force of the X-direction drive motor 170x, the Y-direction moving member 80 is pressed upward via the engagement between the movement limit lug 80a and the movement limit lug 71c and the engagement between the movement limit lug 80b and the movement limit lug 71d. During this movement, the moving force of the Y-direction moving member 80 does not act on the Y-direction driven nut member 85y because this direction of movement of the Y-direction moving member 80 is a direction to disengage the nut contacting portion 80e from the Y-direction driven nut member 85y. Namely, even if the Y-direction moving stage 71 is forced to move forward or reverse in the Y-direction by an external force, or the like, when the Y-direction drive motor 170y is not in operation, no undue loads are exerted on the screw-engaged portion between the X-direction driven nut member 85y and the feed screw 171y.

As can be understood from the above description, according to the above illustrated embodiment of the image stabilizer, in either of the following two cases, i.e., the case where a malfunction occurs in the moving operation of the X-direction moving stage 21 and/or the Y-direction moving stage 71 when driven by the X-direction drive motor 170x or the Y-direction drive motor 170y; and the case where the X-direction moving stage 21 and/or the Y-direction moving stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are applied on either of the two screw-engaged portions between the X-direction driven nut member 85x and the feed screw 171x and between the Y-direction driven nut member 85y and the feed screw 171y, which produces a high degree of effectiveness of preventing each of these two screw-engaged portions from being damaged. Although it is possible to drive the X-direction moving stage 21 and the Y-direction moving stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 27:
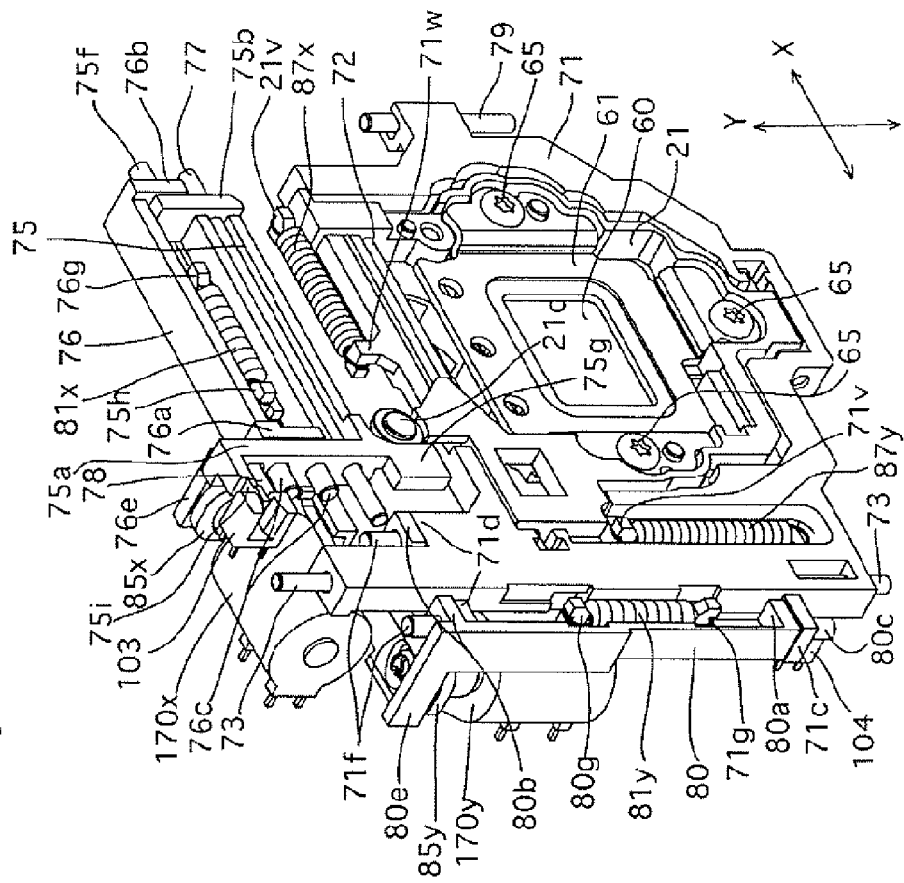
FIG. 27 is a rear perspective view of the elements of the image stabilizing unit shown in FIG. 26.
Figure 26:
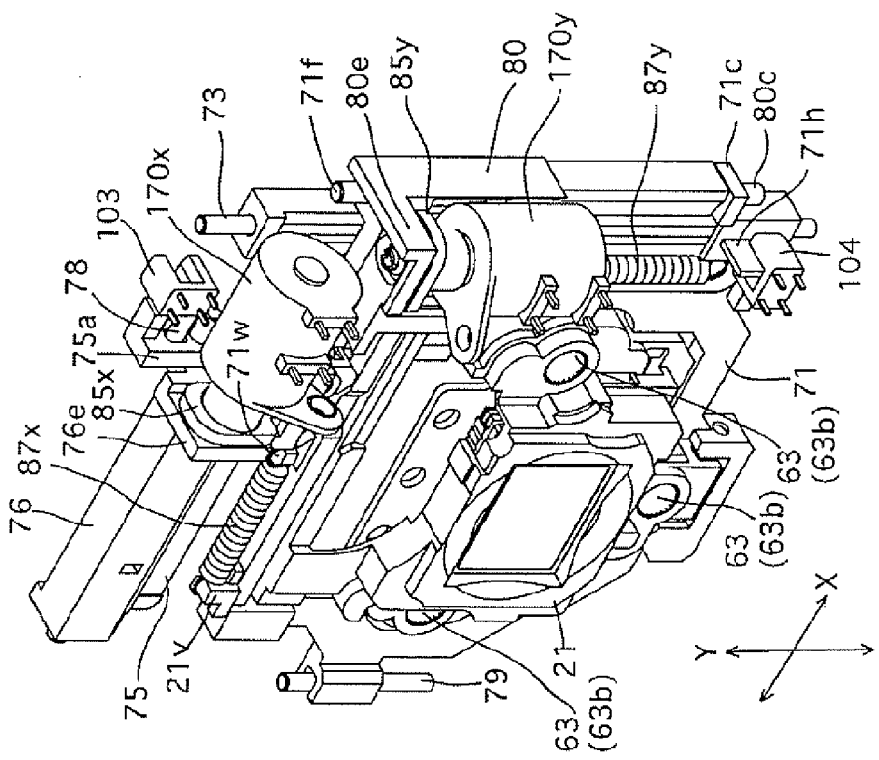
FIG. 26 is a view similar to that of FIG. 18, showing another embodiment (second embodiment) of the image stabilizing unit from which the stationary holder is removed.
Figure 28:
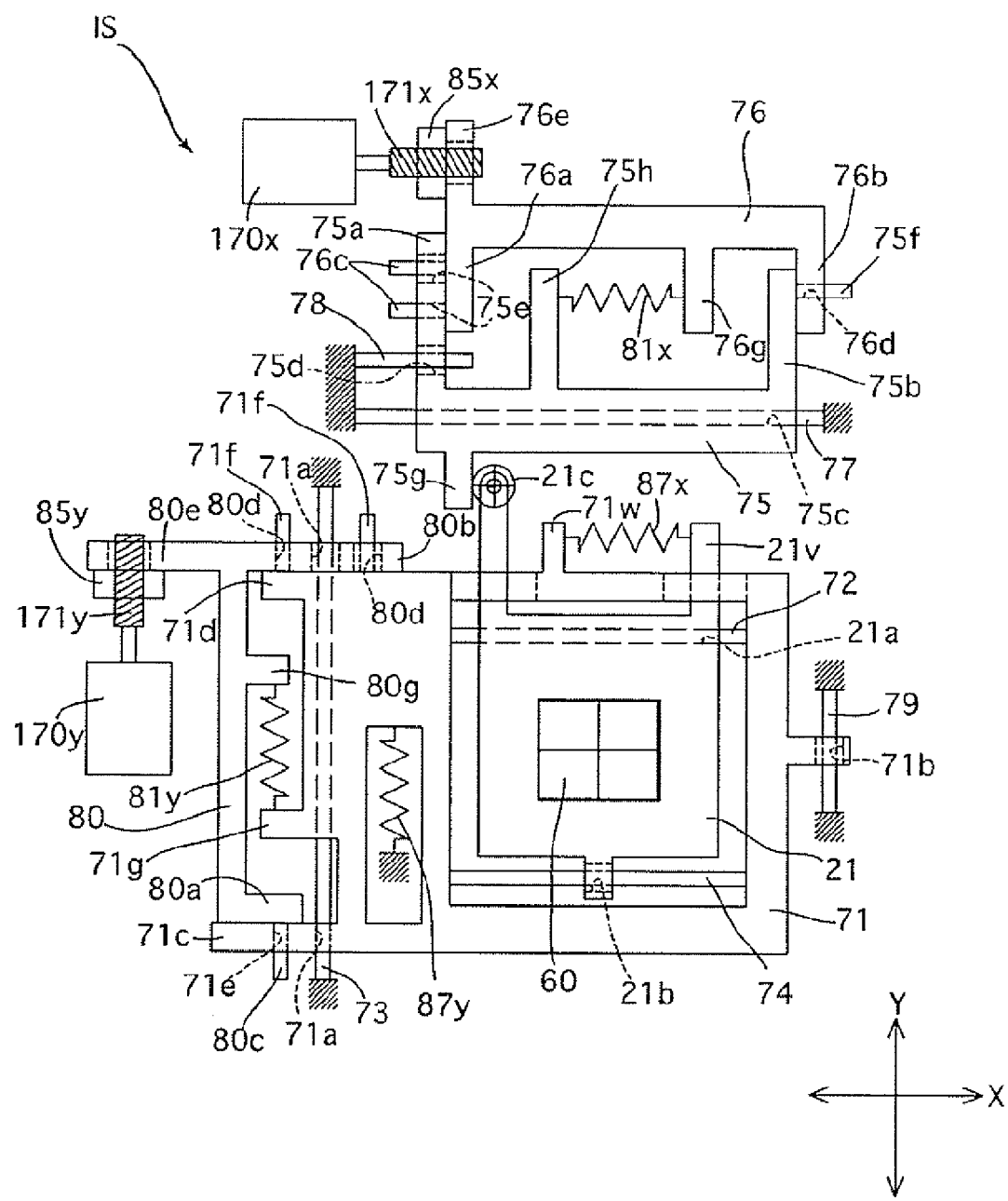
FIG. 28 is a diagrammatic illustration of the second embodiment of the image stabilizing unit, showing the structure thereof.
Figure 29:
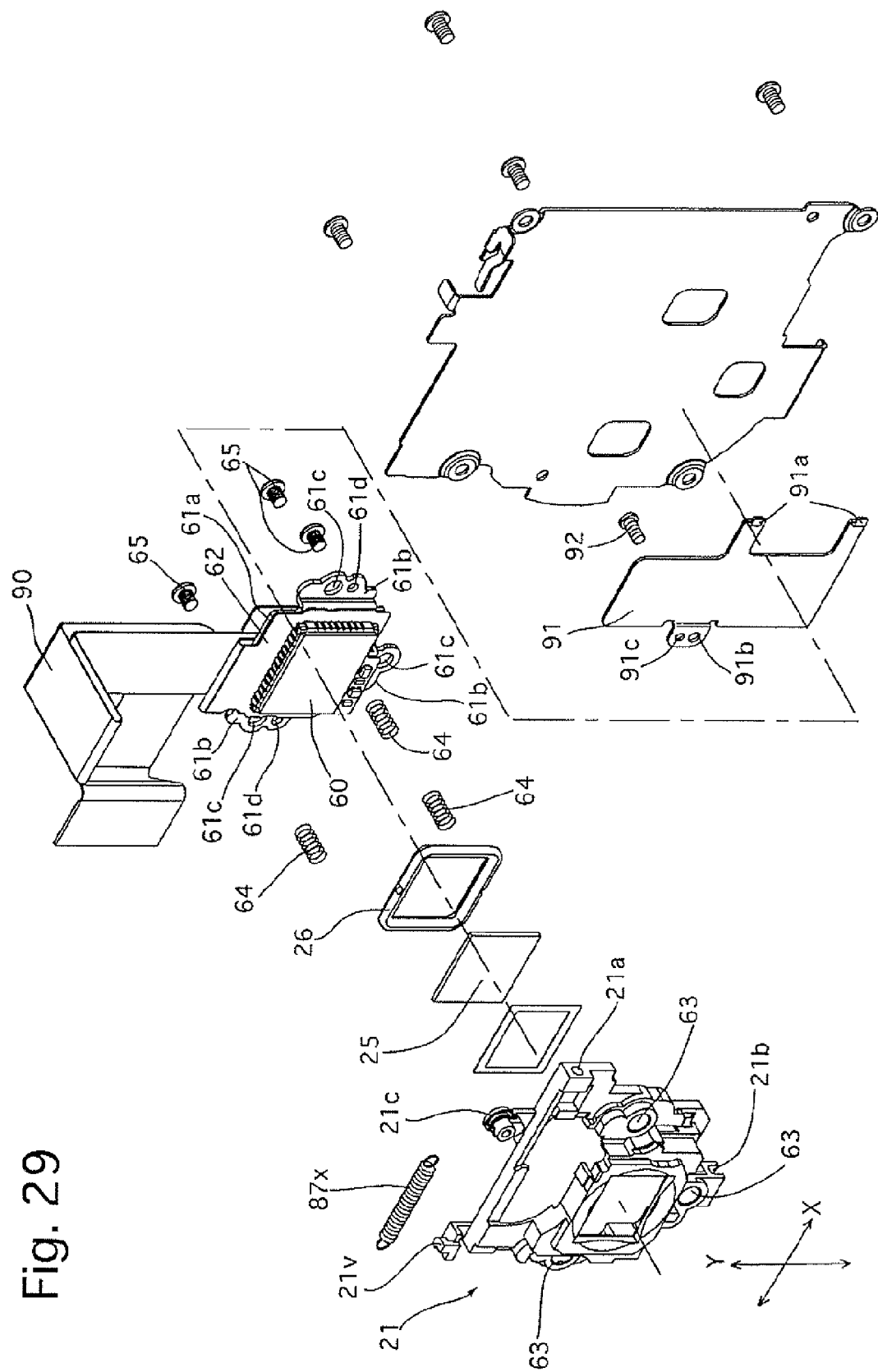
FIG. 29 is an exploded front perspective view of the CCD unit and a stationary cover shown in FIG. 10.
Figure 30:
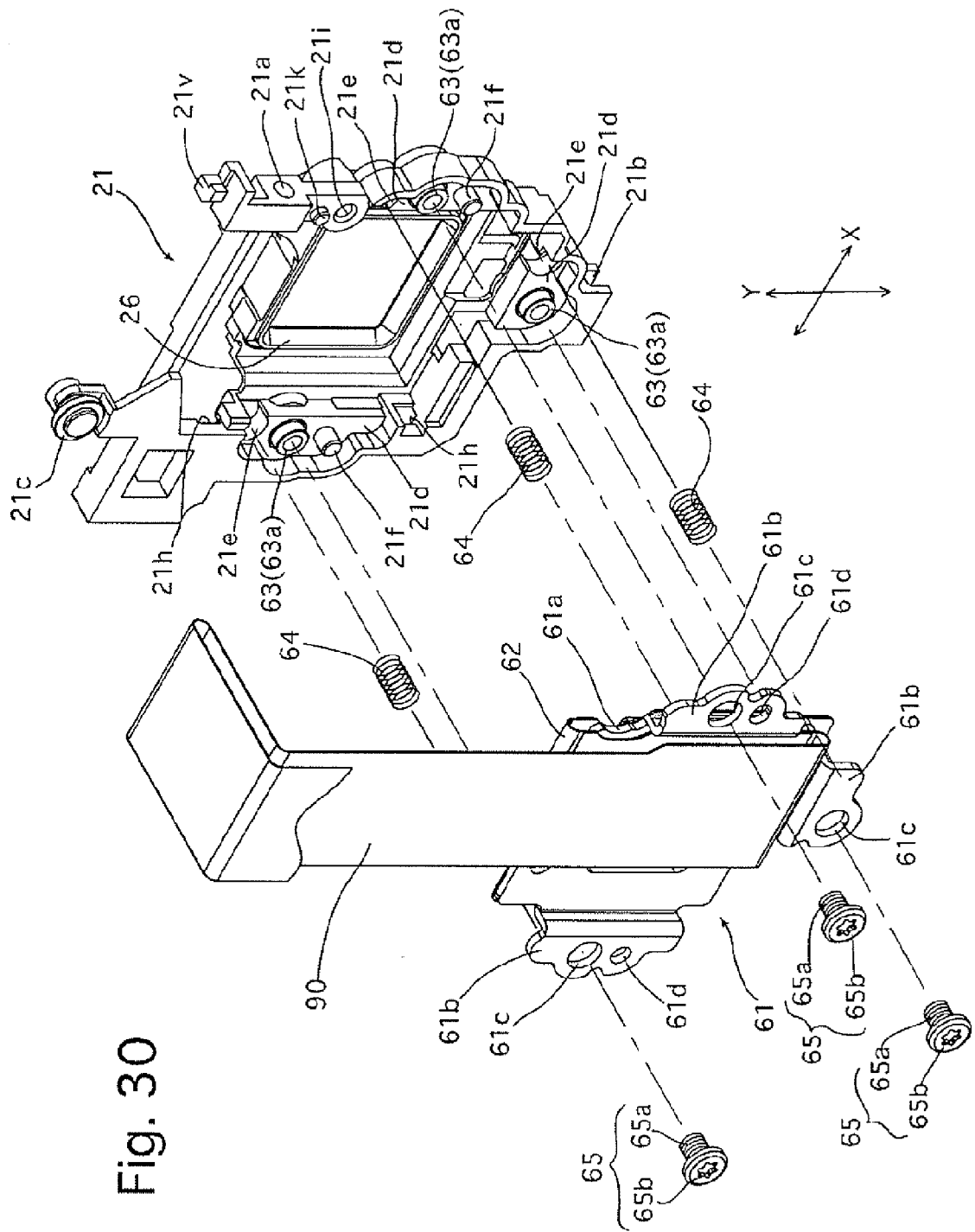
FIG. 30 is an exploded rear perspective view 5 of the CCD unit.

FIGS. 26 through 28 show second embodiment of the image stabilizing unit IS. In the second embodiment, the elements corresponding to those in the first embodiment of the image stabilizer IS are designated with like reference numerals. The second embodiment of the image stabilizing unit is the same as the first embodiment of the image stabilizing unit except that one end (left end as viewed in FIG. 28) of the X-direction stage biasing spring 87x is hooked on the Y-direction moving stage 71, not on the stationary holder 23. More specifically, the X-direction stage biasing spring 87x is extended so as to be installed between a spring hook 71w formed on the Y-direction moving stage 71 and the spring hook 21v of the X-direction moving stage 21. The same effect as that of the first embodiment of the image stabilizing unit can be obtained in the second embodiment of the image stabilizing unit.

In the above illustrated embodiments, the CCD image sensor 60, the low-pass filter 25 and other associated elements are unitized, and this unit (CCD unit) is driven when image shake is counteracted. The structure of this CCD unit will be discussed in detail with reference to FIGS. 29 through 37.

As shown in FIGS. 29 through 34, the low-pass filter 25 and the CCD image sensor (image pickup device) 60 are held between the X-direction moving stage (reference member) 21 and a CCD retaining plate (image pickup device mounting plate/image pickup device mounting member) 61. More specifically, the low-pass filter 25 is in contact with an inner surface of the X-direction moving stage 21 at the front opening thereof, and the imaging surface of the CCD image sensor 60 is positioned behind the low-pass filter 25 with an annular sealing member 26 held between the low-pass filter 25 and the CCD image sensor 60. The sealing member 26 is made of a resilient material. The CCD image sensor 60, together with a CCD substrate 62, is fixed to a front surface of the CCD retaining plate 61. The CCD substrate 62 is extended to the back of the CCD retaining plate 61 to be connected to one end of a flexible printed wiring board thereinafter referred to as a flexible PWB) 90 adopted for image signal transmission. Another end of the flexible PWB 90 is connected to a stationary circuit board 102a (shown in FIGS. 7 and 12) on which the control circuit 102 is mounted.

The CCD retaining plate 61 is provided with a front flat portion 61a and three support lugs 61b. The front flat portion 61a is configured to support the CCD image sensor 60 and the CCD substrate 62. Two of the three support lugs 61b project horizontally in opposite directions while the remaining support lug 61b projects downwards. The X-direction moving stage 21 is provided with three recesses 21d which are shaped to allow the three support lugs 61b to be fitted therein, respectively. The three support lugs 61b are provided with three circular through-holes (elements of an inclination angle adjusting mechanism) 61c which extend through the three support lugs 61b in a forward/rearward direction, respectively. Three nuts (elements of the inclination angle adjusting mechanism) 63 are fixed to the X-direction moving stage 21 inside the three recesses 21d to face the through-holes 61c, respectively. The X-direction moving stage 21 is provided in the vicinity of the three nuts 63 with three spring accommodation recesses 21e in which three compression coil springs (biasing device/elements of the inclination angle adjusting mechanism) 64 are accommodated, respectively. The two side support lugs 61b of the front flat portion 61a are provided below the associated two through-holes 61c with two positioning holes 61d, respectively. The X-direction moving stage 21 is provided in two of the three recesses 21d with two positioning projections 21f which can be engaged in the two positioning holes 61d, respectively.

Figure 35:
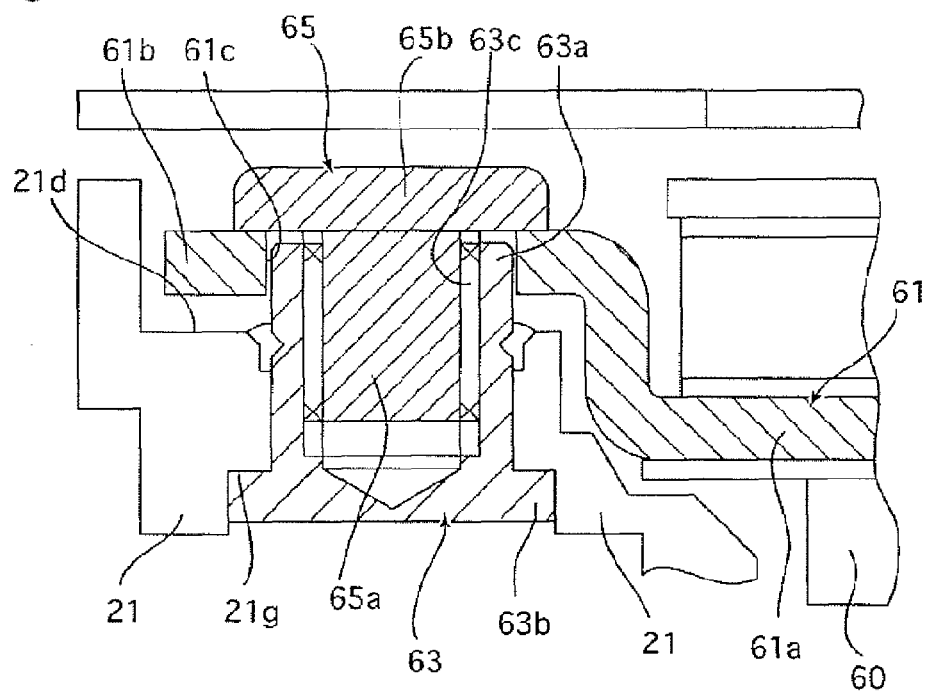
FIG. 35 is an enlarged cross sectional view of a portion of the image stabilizing unit in the vicinity of one of the two adjusting screws shown in FIG. 33.
Figure 36:
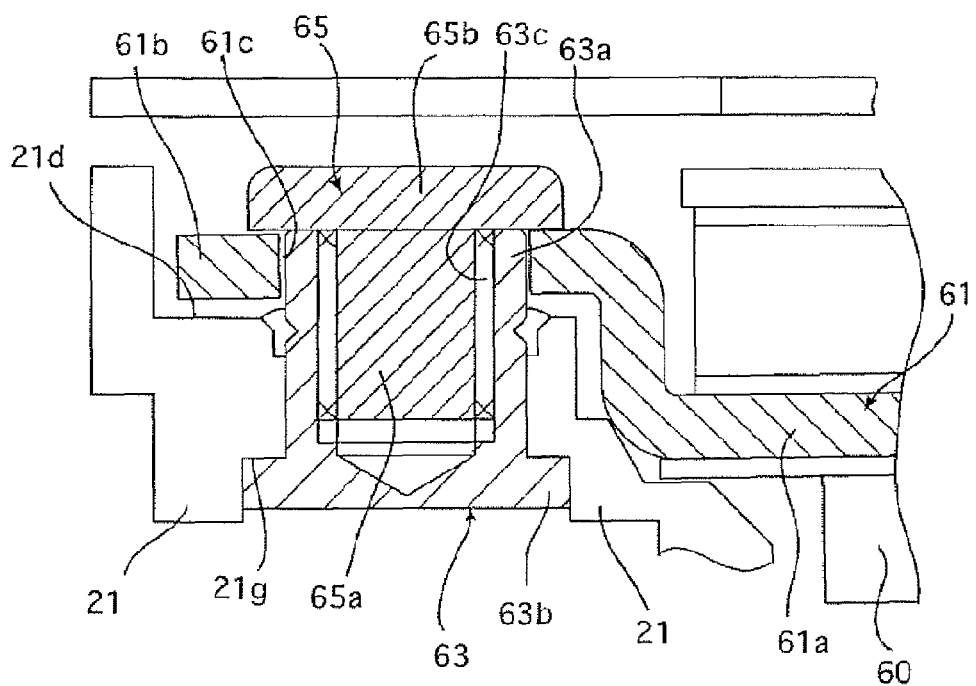
FIG. 36 is an enlarged cross sectional view of a portion of the image stabilizing unit in the vicinity of one of the two adjusting screws shown in FIG. 34.
Figure 37:
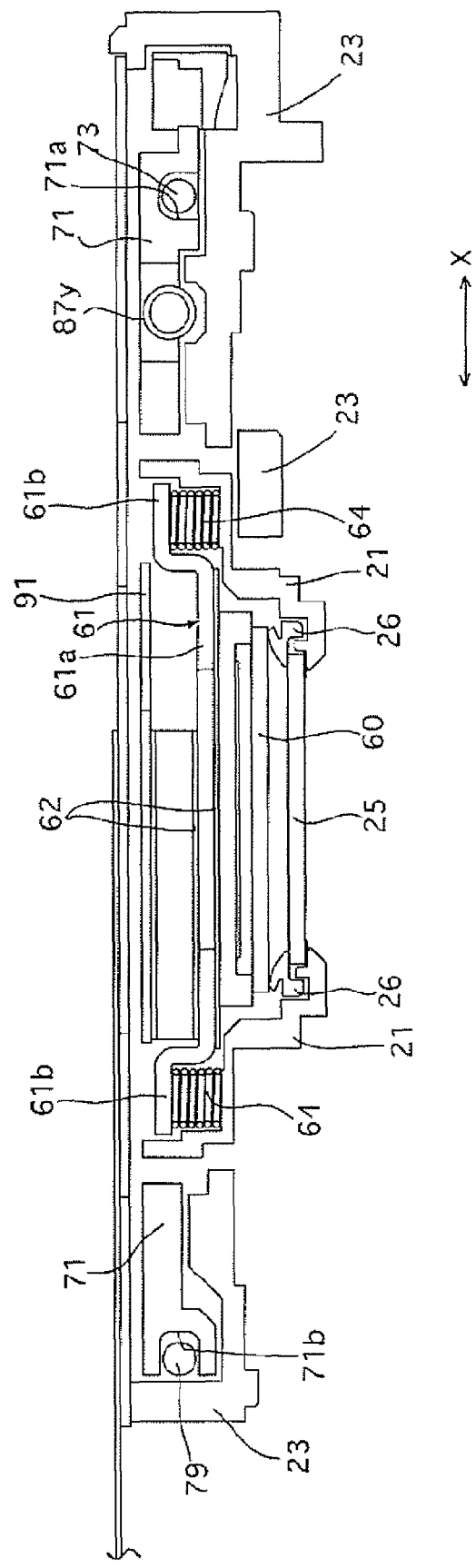
FIG. 37 is a cross sectional view of the image stabilizing unit, taken along a plane in which two compression coil springs of the CCD unit are positioned.

The three nuts 63 are made of metal which is a different material from the X-direction moving stage 21. Each nut 63 is provided with a hollow cylinder portion (screw hearing seat) 63a and is further provided at one end of the cylinder portion (cylindrical shaft portion) 63a with a flange portion 63b. The three nuts 63 are fixed to the X-direction moving stage 21 with the three flange portions 63b being engaged in three large-diameter holes 21g formed on the front of the X-direction moving stage 21, respectively. The cylinder portion 63a of each nut 63 extends through the bottom of the associated large-diameter portion 21g to project rearward in the optical axis direction from the bottom surface (reference surface) of the associated recess 21d. As shown in FIGS. 35 and 36, the outer diameter of the cylinder portion 63a of each nut 63 is predetermined to be slightly smaller than the inner diameter (opening diameter) of the associated through-hole 61c of the CCD retaining plate 61. Each nut 63 is provided along the axis of the cylindrical portion 63a thereof with a female screw hole 63c so that three CCD adjustment screws (elements of the inclination angle adjusting mechanism) 65 are screwed into the three female screw holes 63c from the ends thereof (from the rear ends thereof in the optical axis direction), respectively. Each CCD adjustment screw 65 is provided with a shaft portion (screw shaft portion) 65a including a male thread portion thereon which is screw-engaged with the associated female screw hole 63c, and a head portion 65b which is greater in diameter than the shaft portion 65a. Unlike the cylinder portion 63a, the outer diameter of the head portion 65b is predetermined to be greater than the inner diameter (opening diameter) of the associated through-hole 61c.

When the CCD unit is assembled, the CCD retaining plate 61 and the X-direction moving stage 21 are brought to approach each other so that the three support lugs 61b enter the corresponding three recesses 21d, respectively, with the three compression coil springs 64 inserted into the three spring accommodation recesses 21e in a compressed state, respectively. Thereupon, the two positioning projections 21f engage in the two positioning holes 61d, respectively, which determines the relative position between the X-direction moving stage 21 and the CCD image sensor 60. Additionally, bringing the CCD retaining plate 61 and the X-direction moving stage 21 closer to each other to some extent causes the ends of the hollow cylinder portions 63a of the three nuts 63 to enter the three circular through-holes 61c, respectively, since the outer diameter of the cylinder portion 63a of each nut 63 is smaller than the inner diameter (opening diameter) of the associated through-hole 61c as mentioned above.

Subsequently, the shaft portions 65a of the three CCD adjustment screws 65 are screwed into the female screw holes 63c of the three nuts 63, respectively. Bringing the X-direction moving stage 21 and the CCD retaining plate 61 closer to each other causes the compressed coil springs 64, which are inserted in the three recesses 21d, to be compressed between the X-direction moving stage 21 and the three support lugs 61b. Due to the resilient force of the compressed coil springs 64 thus compressed, the CCD retaining plate 61 is biased in a direction away from the X-direction moving stage 21 (rearwards in the optical axis direction) (see FIG. 37). However, the back surfaces of the head portions 65b of the three CCD adjustment screws 65 prevent the CCD retaining plate 61 from moving rearward, thus defining the position of the CCD retaining plate 61 in the optical axis direction. Accordingly, the X-direction moving stage 21 and the CCD retaining plate 61 are joined together with the CCD image sensor 60 and the low-pass filter 25 held therebetween.

Figure 31:
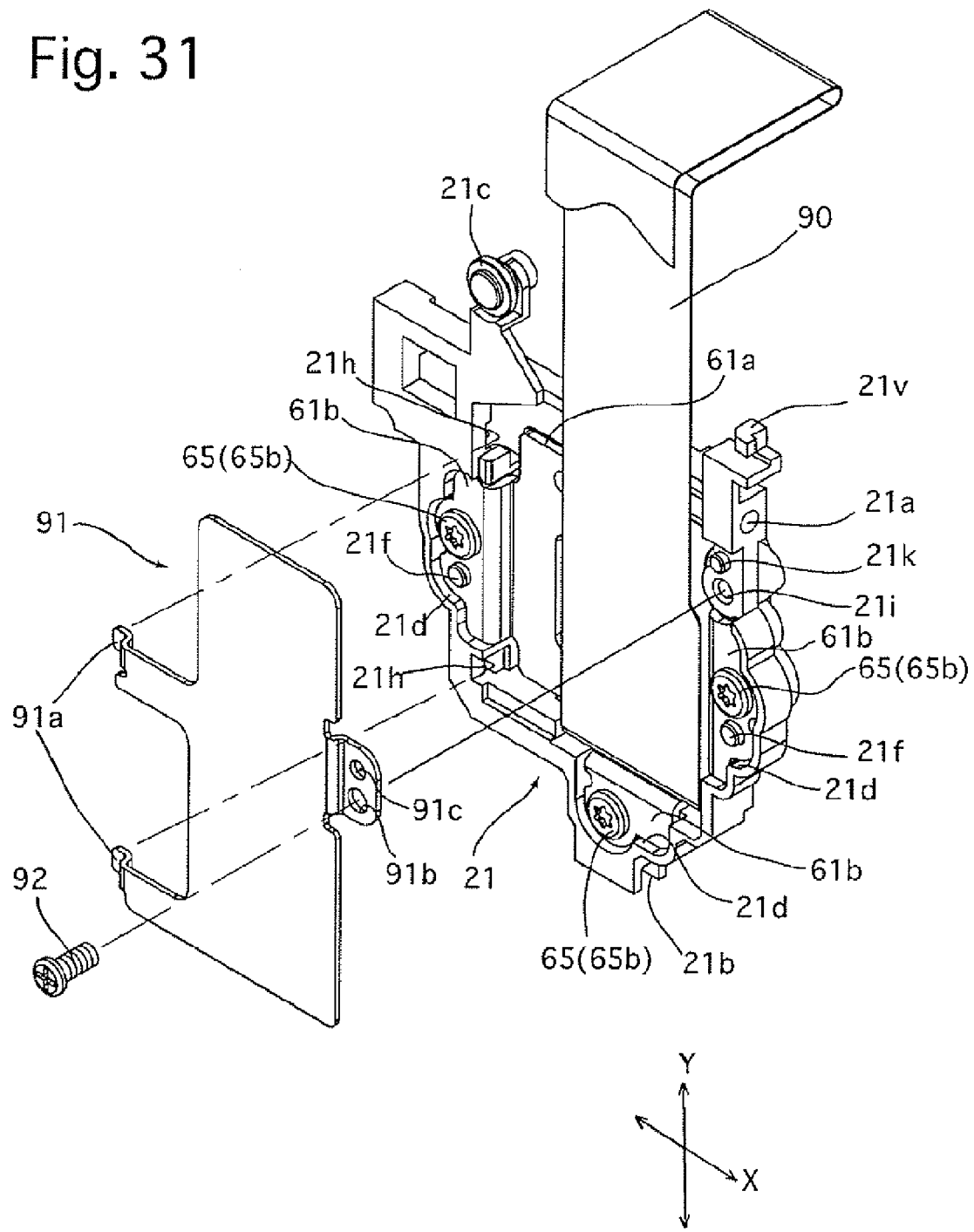
FIG. 31 is an exploded rear perspective view of the CCD unit, showing a state where the CCD retaining plate is fixed to the X-direction moving stage.
Figure 32:
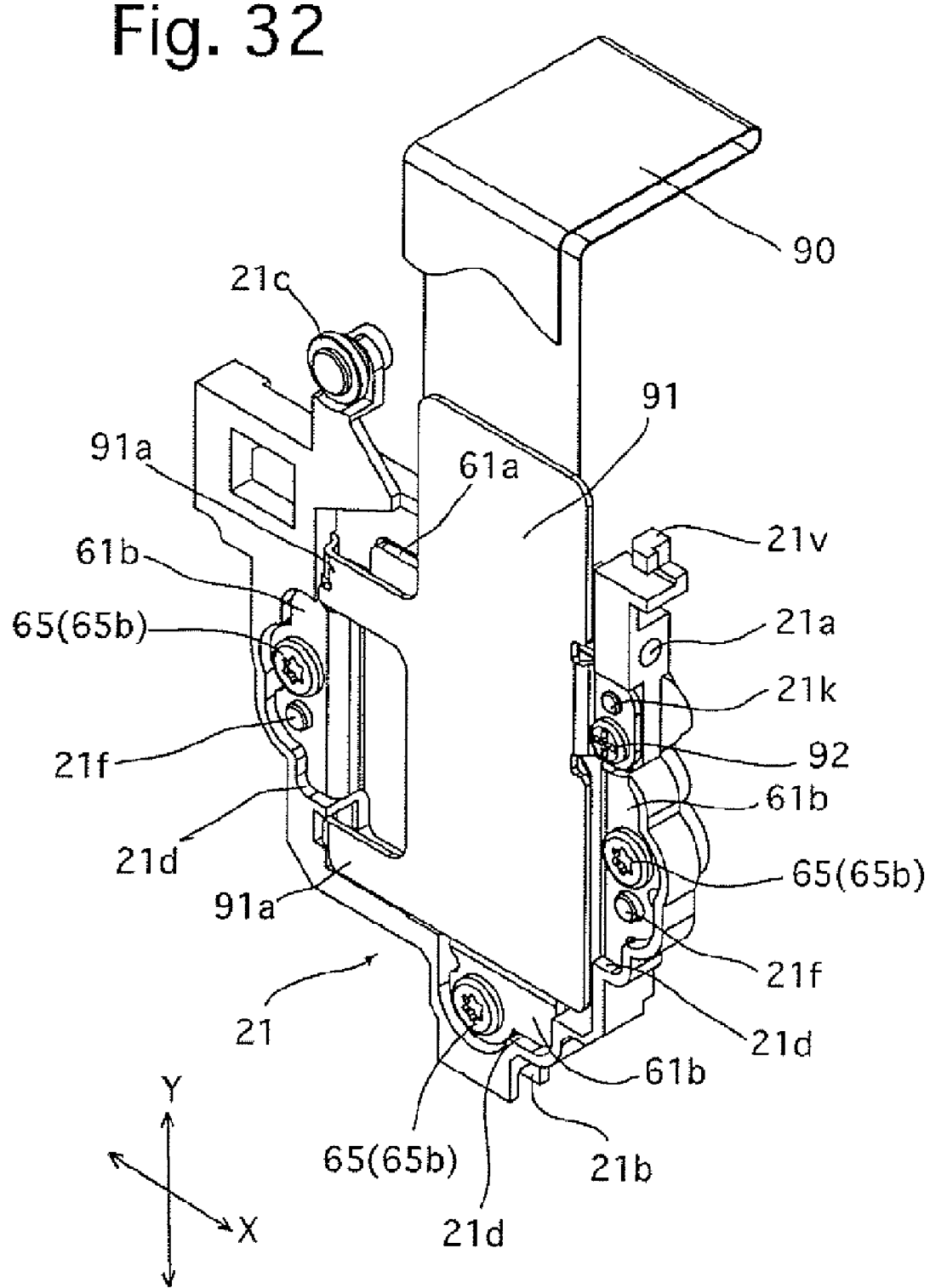
FIG. 32 is a rear perspective view of the CCD unit in an assembled state thereof.

A movable plate 91 is fixed to the back of the X-direction moving stage 21 after the X-direction moving stage 21 and the CCD retaining plate 61 are joined together (see FIGS. 31 and 32). The X-direction moving stage 21 is provided with a pair of engaging holes 21h, a screw hole 21i and a positioning projection 21k. The movable plate 91 is provided with a pair of locking lugs 91a, a through-hole 91b and a positioning hole 91c which are engaged in the pair of engaging holes 21h, the screw hole 21i and the positioning projection 21k of the X-direction moving stage 21, respectively. The movable plate 91 is secured to the X-direction moving stage 21 by a set screw 92 which is screwed into the screw hole 21i of the X-direction moving stage 21 in a state where the ends of the pair of locking lugs 91a have been engaged in the pair of engaging holes 21h and where the positioning projection 21k has been engaged in the positioning hole 91c (see FIG. 32). The movable plate 91 can stably support the flexible PWB 90. The CCD unit is completed by fixing the movable plate 91 to the back of the X-direction moving stage 21 in this manner.

In this completed CCD unit, the three CCD adjustment screws 65 are arranged dispersively at three different points about the center of the imaging surface of the CCD image sensor 60, and accordingly, the angle (inclination angle/setting angle) of the CCD retaining plate 61 relative to the photographing optical axis Z1, i.e., the angle (inclination angle/setting angle) of the imaging surface of the CCD image sensor 60 relative to the photographing optical axis Z1 can be adjusted by adjusting the tightening amount of each CCD adjustment screw 65. For instance, if the tightening amount of one CCD adjustment screw 65 is increased, the associated head portion 65b that defines the position of the CCD retaining plate 61 in the optical axis direction moves forward in the optical axis direction. This forward movement of the head portion 65b causes the associated support lug 61b which is in contact with the one CCD adjustment screw 65 to be pushed forward. Conversely, if the tightening amount of one CCD adjustment screw 65 is decreased, the associated head portion 65b moves rearward in the optical axis direction. This rearward movement of the head portion 65b causes the associated support lug 61b, which is in contact with one CCD adjustment screw 65, to be pushed rearward by the biasing force of the associated compression coil springs 64. The inclination angle of the CCD image sensor 60 relative to the photographing optical axis 21 can be adjusted by changing the balance among the tightening amounts of the three CCD adjustment screws 65. As shown in FIG. 32, the head portions 65b of the three CCD adjustment screws 65 are exposed to the rear of the movable plate 91 (i.e., exposed at the back of the CCD unit) in a state where the movable plate 91 is mounted, and accordingly, the above described inclination angle adjustment operation for adjusting the angle of the CCD image sensor 60 relative to the photographing optical axis Z1 can be carried out without dismounting the movable plate 91.

Figure 33:
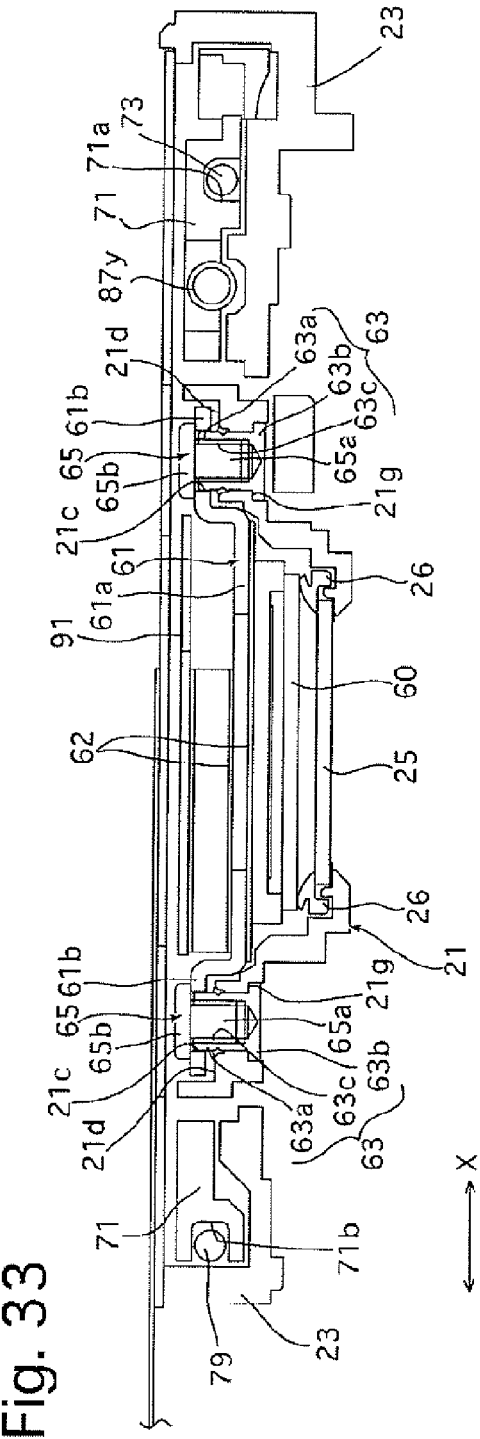
FIG. 33 is a cross sectional view of the image stabilizing unit in a state before an inclination angle adjustment is made to the CCD image sensor.
Figure 34:
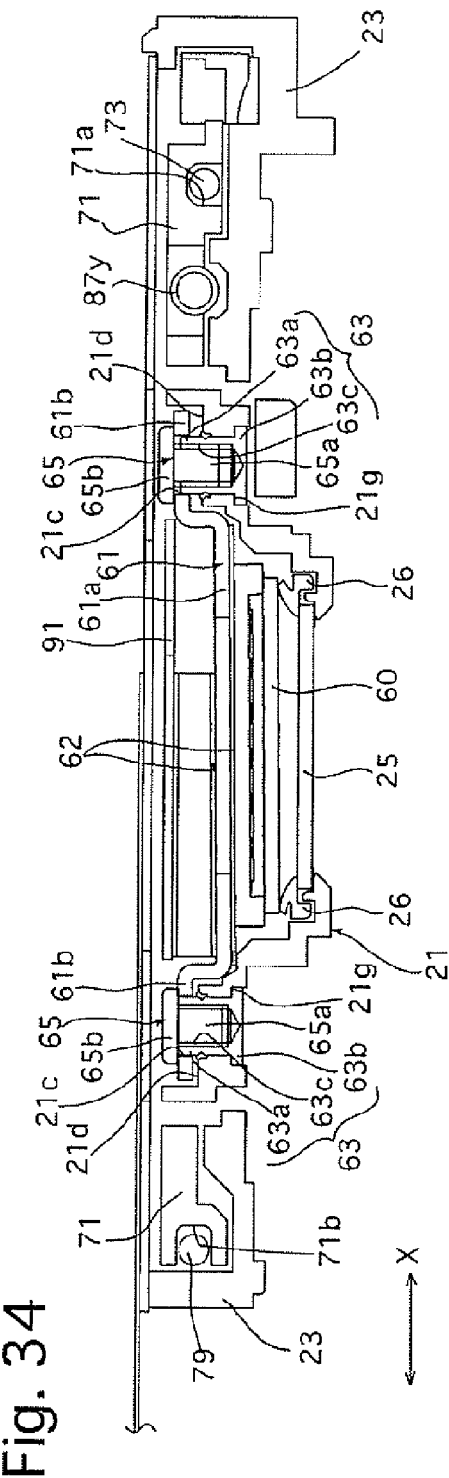
FIG. 34 is a cross sectional view of the image stabilizing unit in a state after the inclination angle adjustment has been made to the CCD image sensor.

FIGS. 33 and 34 are cross sectional views of the image stabilizing unit IS, respectively, showing two different states before and after making adjustments to specific two of the three CCD adjustment screws 65 which are positioned on the horizontally opposite sides of the front flat portion 61a. In the state shown in FIG. 33, the tightening amounts of these two CCD adjustment screws 65 (the right and left CCD adjustment screws 65) are substantially identical and are not tightened to the maximum tightening position (to the limit tightening position) relative to the female screw holes 63c of the associated two nuts 63. FIG. 35 is an enlarged view of one of the right and left CCD adjustment screws 65 (the left CCD adjustment screw 65 as viewed in FIG. 34) and adjacent elements thereof in the state shown in FIG. 33. As can be seen from FIG. 35, the associated support lug 61*b* abuts against the back surface of the head portion 65*b* of the CCD adjustment screw 65 by the biasing force of the associated compression coil spring 64; however, there is room for the head portion 65*b* and the support lug 61*b* to be moved forward (downwards as viewed in FIG. 35) by further tightening the CCD adjustment screw 65 since there is still a space between the end of the cylinder portion 63*a* and the head portion 65*b*.

FIG. 34 illustrates a state in which the left CCD adjustment screw 65 has been tightened to the maximum (the maximum tightening position) As can be seen in the enlarged view of the left CCD adjustment screw 65 and adjacent elements thereof in FIG. 36, the support lug 61*b*, which is in contact with the left CCD adjustment screw 65, has been pushed forward from the position shown in FIG. 35 against the biasing force of the compression coil spring 64 to thereby cause the CCD retaining plate 61 and the CCD image sensor 60 to tilt relative to the X-direction moving stage 21 (relative to the optical axis direction). In this state, the X-direction moving stage 21 is not tilted by the tilting of the CCD image sensor 60; however, the resilient sealing member 26, which is held between the low-pass filter 25 and the CCD image sensor 60, is resiliently deformed by the tilting of the CCD image sensor 60 (see FIG. 34).

As shown in FIG. 36, each CCD adjustment screw 65 can be tightened up until the head portion 65*b* comes into contact with the end of the cylinder portion 63*a* of the associated nut 63 because the cylinder portions 63*a* of the three nuts 63 are inserted in the three circular through-holes 61*c*, respectively. In this state, the support lug 61*b* is not attached between the head portion 65*b* of the associated CCD adjustment screw 65 and the bottom of the associated recess 21*d* of the X-direction moving stage 21, but rather is held without making contact with the bottom of the recess 21*d*. Since the support lug 61*b* is not directly sandwiched between the head portion 65*b* of the associated CCD adjustment screw 65 and the bottom of the associated recess 21*d*, the CCD retaining plate 61 is not prevented from tilting even if the CCD adjustment screw 65 is tightened to the maximum (the maximum tightening position) when the tightening amount of either of the remaining two CCD adjustment screws 65 is changed. Accordingly, the substantially entire range of axial movement of the shaft portion 65*a* of each CCD adjustment screw 65 relative to the associated nut 63 (the female screw hole 63*c* thereof) can be used for making an adjustment (inclination angle adjustment) to the angle of the CCD retaining plate 61.

Figure 38:
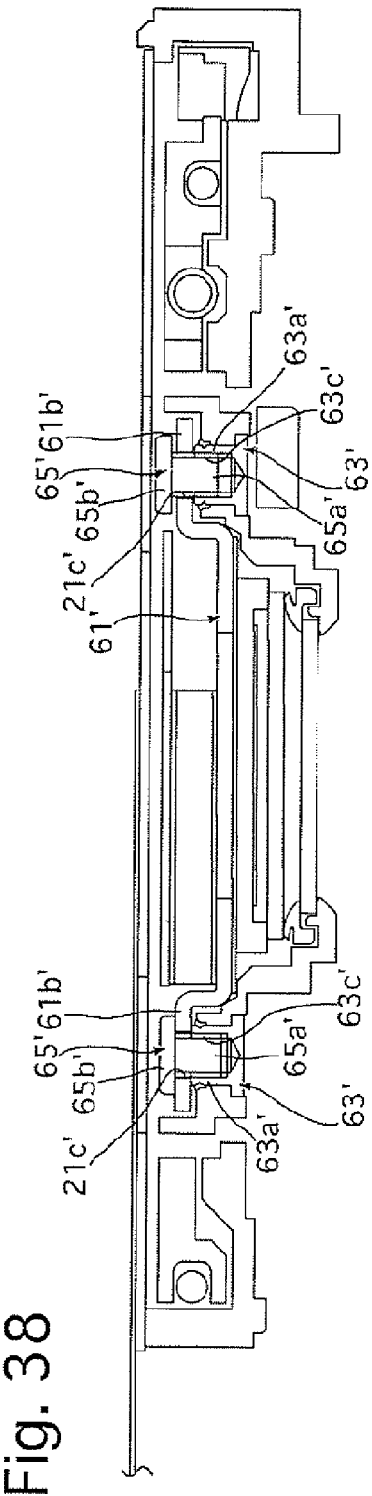
FIG. 38 is a view similar to that of FIG. 37, showing a comparative example of an image stabilizing unit in a state after the inclination angle adjustment has been made to the CCD image sensor.
Figure 39:
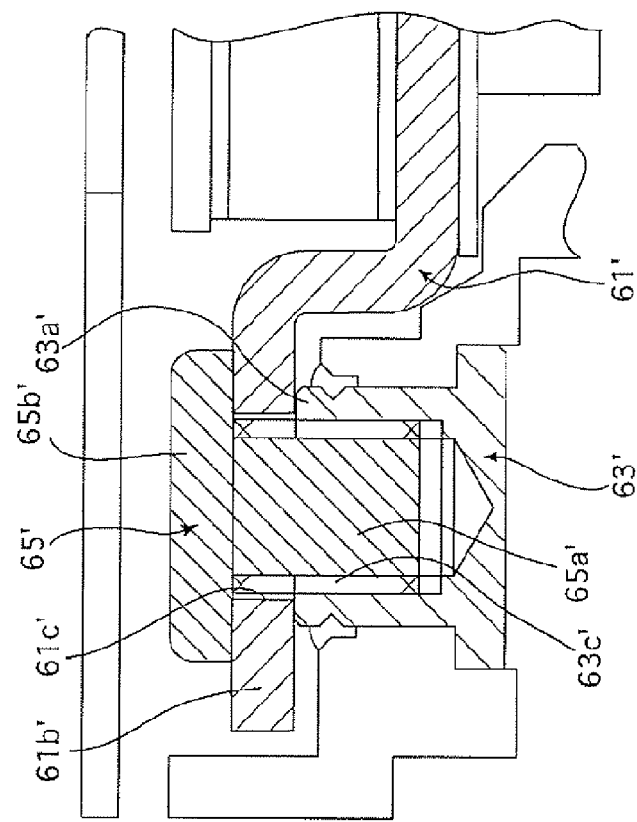
FIG. 39 is an enlarged cross sectional view of a portion of the image stabilizing unit in the vicinity of one of the two adjusting screws shown in FIG. 38.

FIGS. 38 and 39 show a comparative example of an image stabilizing unit, which is to be compared with the present embodiment of the image stabilizing unit IS. This comparative example is different from the present embodiment of the image stabilizing unit IS in that the end of the cylinder portion 63*a*' of each nut 63' (which corresponds to each nut 63 of the image stabilizing unit IS) and the head portion 65*b*' of the associated CCD adjustment screw 65' (which corresponds to the associated CCD adjustment screw 65 of the image stabilizing unit IS) are positioned on opposite sides of the associated support lug 61*b*' of a CCD retaining plate 61' (which corresponds to the CCD retaining plate 61 of the image stabilizing unit IS) to hold the support lug 61*b*' without the cylinder portions 63*a*' of the three nuts 63' being inserted into three circular through-holes 61*c*' (which correspond to the three circular through-holes 61*c* in the image stabilizing unit IS) of the CCD retaining plate 61', respectively.

In a state shown in FIG. 38, the left CCD adjustment screw 65' has been tightened to the maximum. As can be seen in the enlarged view of the left CCD adjustment screw 65' and adjacent elements thereof in FIG. 39, the support lug 61*b*' (which corresponds to the support lug 61*b* of the image stabilizing unit IS) of the CCD retaining plate 61' is held between the end of the cylinder portion 63*a*' and the head portion 65*b*', so that the CCD adjustment screw 65' cannot be further screwed forward from the position shown in FIG. 39. Additionally, since the CCD retaining plate 61' is fixed at this position where the support lug 61*b*' is held, the whole CCD retaining plate 61' has been moved forward substantially parallel to itself with no inclination angle adjustment being made to the CCD retaining plate 61' (i.e., to the CCD image sensor) as shown in FIG. 38. Specifically, even though the tightening amount of the right CCD adjustment screw 65' is smaller than the tightening amount of the left CCD adjustment screw 65', the right support lug 61*b*' as viewed in FIG. 38 has followed the left CCD adjustment screw 65' to thereby have been moved forward, thus being positioned off (away from) the head portion 65*b*' of the right CCD adjustment screw 65'. Therefore, even if the tightening amount of the right CCD adjustment screw 65' is changed in the state shown in FIG. 38, the angle of the CCD retaining plate 61' cannot be adjusted. Accordingly, in the comparative example shown in FIG. 38, each CCD adjustment screw 65' is not tightened to the maximum tightening position (to the limit tightening position) relative to the associated nut 63' to make the inclination angle adjustment operation for the CCD retaining plate 61' possible, so that the entire range of axial movement of the shaft portion 65*a*' of each CCD adjustment screw 65' relative to the associated nut 63' (the female screw hole 63*c*' thereof) cannot be used for making an adjustment (inclination angle adjustment) to the angle of the CCD retaining plate 61'.

In contrast, in the present embodiment of the image stabilizing unit IS that incorporates an inclination angle adjusting mechanism according to the present invention, each CCD adjustment screw 65 can be securely tightened up to the maximum tightening position at which the head portion 65*b* comes Into contact with the end of the cylinder portion 63*a* of the associated nut 63, which makes it possible to widen the range of tightening of each CCD adjustment screw 65. For instance, although the shaft portions 65*a* of the three CCD adjustment screws 65 of the present embodiment shown in FIGS. 35 and 36 and the shaft portions 65*a*' of the three CCD adjustment screws 65' of the comparative example shown in FIGS. 38 and 39 are mutually identical in length, the CCD retaining plate 61 in the present embodiment shown in FIGS. 35 and 36 can be tilted by a greater amount than that in the comparative example shown in FIGS. 38 and 39. In other words, using short adjustment screws makes it possible to achieve a small-sized inclination angle adjusting mechanism for image pickup device with which the inclination angle of the image pickup device can be securely adjusted.

Although the present invention has been described based on the above illustrated embodiments, the present invention is not limited solely to these particular embodiments. For instance, although the three nuts 63 are metal parts provided as elements independent of the X-direction moving stage 21 and fixed to the X-direction moving stage 21 in the above illustrated embodiments, it is possible for screw bearing seats which correspond to the hollow cylinder portions 63*a* of the three nuts 63 to be formed integral with the reference member (the X-direction moving stage 21).

Although three CCD adjustment screws 65 are arranged in the above described embodiments, the number of the CCD adjustment screws 65 (the number of the associated screw bearing seats) is optional.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An inclination angle adjusting mechanism for changing the angle of an image pickup device, comprising:
   a mounting plate to which said image pickup device is mounted;
   a reference member which holds said mounting plate;
   a plurality of through-holes formed in said mounting plate at positions dispersively around said image pickup device;
   a plurality of screw bearing seats which project from a reference surface of said reference member to correspond to said through-holes, respectively, and which have outer diameters allowing said screw bearing seats to be inserted into said through-holes, respectively;
   a plurality of adjustment screws, each of which includes a screw shaft portion and a head portion, said screw shaft portions of said adjustment screws being screwed into female screw holes formed in said screw bearing seats, respectively, and said head portions of said adjustment screws being in contact with said image pickup device mounting plate; and
   a biasing device which biases said mounting plate in a direction away from said reference member to bring said mounting plate into contact with back surfaces of said head portions of said adjustment screws,
   wherein maximum tightening positions of said adjustment screws relative to said female screw holes of said screw bearing seats are defined by engagement of back surfaces of said head portions of said adjustment screws with ends of said screw bearing seats, respectively,
   wherein said mounting plate remains not in contact with said reference surface.

2. The inclination angle adjusting mechanism according to claim 1, wherein each of said through-holes of said mounting plate comprises a circular hole, and
   wherein each of said screw bearing seats is in the shape of a hollow cylinder.

3. The inclination angle adjusting mechanism according to claim 1, wherein each of said screw bearing seats comprises a metal nut which is fixed to said reference member.

4. The inclination angle adjusting mechanism according to claim 1, wherein said biasing device comprises a plurality of compression coil springs installed between said mounting plate and said reference member.

5. The inclination angle adjusting mechanism according to claim 1, wherein the number of said adjustment screws is three, and
   wherein the number of said screw bearing seats is three.

6. The inclination angle adjusting mechanism according to claim 1, wherein said inclination angle adjusting mechanism is incorporated in an imaging stabilizer which moves said image pickup device in a plane orthogonal to an optical axis to counteract image shake of an object image formed on an imaging surface of said image pickup device.

7. The inclination angle adjusting mechanism according to claim 6, wherein said imaging stabilizer is incorporated in a digital camera.

8. The inclination angle adjusting mechanism according to claim 1, wherein said mounting plate comprises:
   a flat portion to which said image pickup device is mounted; and
   a plurality of support lugs which lie in a plane parallel to another plane in which said flat portion lies,
   wherein said through-holes of said mounting plate are formed in said support lugs, respectively.

9. The inclination angle adjusting mechanism according to claim 8, wherein said support lugs of said mounting plate are positioned behind said flat portion in an optical axis direction, and
   wherein said screw bearing seats are inserted into said through-holes of said support lugs of said mounting plate from a front side of said flat portion, respectively.

10. The inclination angle adjusting mechanism according to claim 1, wherein said reference member is guided in two directions orthogonal to each other in a predetermined plane.

11. An inclination angle adjusting mechanism for changing the angle of an image pickup device, comprising:
    a mounting member to which said image pickup device is mounted;
    a reference member which holds said mounting member;
    a plurality of screw bearing seats which project from a reference surface of said reference member;
    a plurality of adjustment screws which are positioned dispersively around said image pickup device and each of which includes a screw shaft portion and a head portion, said screw shaft portions of said adjustment screws being screwed into female screw holes formed in said screw bearing seats, respectively, and said head portions of said adjustment screws being in contact with said mounting member; and
    a biasing device which biases said mounting member in a direction away from said reference member to bring said mounting member into contact with back surfaces of said adjustment screws,
    wherein maximum tightening positions of said adjustment screws relative to said female screw holes of said screw bearing seats are defined by engagements of back surfaces of said head portions of said adjustment screws with ends of said screw bearing seats, respectively,
    wherein said mounting member remains not in contact with said reference surface.

12. An inclination angle adjusting mechanism for changing the angle of an image pickup device, comprising:
    a mounting member to which said image pickup device is mounted;
    a reference member which holds said mounting member;
    a plurality of screw bearing seats which project from a reference surface of said reference member;
    a plurality of adjustment screws which are positioned dispersively around said image pickup device and each of which includes a screw shaft portion and a head portion, said screw shaft portions of said adjustment screws being inserted through through-holes formed in said mounting member and screwed into female screw holes formed in said screw bearing seats, respectively, and said head portions of said adjustment screws being in contact with said mounting member; and
    a biasing device which biases said mounting member in a direction away from said reference member to bring said mounting member into contact with back surfaces of said adjustment screws,
    wherein inner diameters of said through-holes of said mounting member are greater than outer diameters of said screw bearing seats, so that said through-holes allow said screw bearing seats to be inserted thereinto, respectively, and wherein outer diameters of said head portions of said adjustment screws are greater than said inner diameters of associated said through-holes, respectively.

13. The inclination angle adjusting mechanism according to claim 12, wherein a clearance which is defined between each of said back surfaces of said head portions of said adjustment screws and said reference surface in an axial direction of said adjustment screws is greater than a thickness of said mounting member around said through-holes, when each of said adjustment screws is at a maximum tightening position relative to said female screw hole of said screw bearing seat.

* * * * *